US008339389B2

(12) United States Patent
Sasaki et al.

(10) Patent No.: US 8,339,389 B2
(45) Date of Patent: Dec. 25, 2012

(54) ELECTRO-OPTICAL DEVICE, DRIVING METHOD THEREOF, AND ELECTRONIC APPARATUS WITH ADJUSTABLE RATIO BETWEEN POSITIVE AND NEGATIVE FIELD USING BLACK DISPLAY VOLTAGE

(75) Inventors: Hitoshi Sasaki, Shiojiri (JP); Takashi Toyooka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 12/544,748

(22) Filed: Aug. 20, 2009

(65) Prior Publication Data

US 2010/0079441 A1 Apr. 1, 2010

(30) Foreign Application Priority Data

Sep. 29, 2008 (JP) ................................ 2008-249799

(51) Int. Cl.
*G06F 3/038* (2006.01)
*G09G 3/36* (2006.01)
*G09G 5/00* (2006.01)

(52) U.S. Cl. ............ 345/213; 345/96; 345/99; 345/209

(58) Field of Classification Search ............ 345/87–103, 345/204, 209, 213, 694; 348/513, 543
See application file for complete search history.

(56) References Cited

U.S. PATENT DOCUMENTS

| | | | | |
|---|---|---|---|---|
| 6,771,245 | B2 | 8/2004 | Kanbe et al. | |
| 2002/0089477 | A1 * | 7/2002 | Kanbe et al. | 345/87 |
| 2005/0104835 | A1 | 5/2005 | Misonou et al. | |
| 2007/0200223 | A1 | 8/2007 | Konishi | |
| 2008/0186296 | A1 * | 8/2008 | Tokumura | 345/209 |
| 2009/0237347 | A1 * | 9/2009 | Yamagishi | 345/102 |

FOREIGN PATENT DOCUMENTS

| | | |
|---|---|---|
| JP | A-8-136897 | 5/1996 |
| JP | A-2000-112437 | 4/2000 |
| JP | A-2002-189460 | 7/2002 |
| JP | A-2005-148606 | 6/2005 |
| JP | A-2007-28062 | 2/2007 |
| JP | A-2007-227762 | 9/2007 |

* cited by examiner

*Primary Examiner* — Bipin Shalwala
*Assistant Examiner* — Keith Crawley
(74) *Attorney, Agent, or Firm* — Oliff & Berridge, PLC

(57) ABSTRACT

A method of driving an electro-optical device having scanning lines, data lines, a switching transistor and a pixel electrode. The device also has an electro-optical layer interposed between the pixel electrode and a counter electrode. The method includes: supplying a data signal alternate between a positive and a negative voltage to the pixel electrode. The positive voltage has a potential greater than a counter electrode potential applied to the counter electrode and the negative voltage is a potential lower than the counter electrode potential; setting the counter electrode potential to reduce a flicker; supplying a first voltage that is either the positive or negative voltage to the pixel electrode in a first period; the other voltage to the pixel electrode in a second period. A ratio of the first period to the second period is variable.

15 Claims, 24 Drawing Sheets

Q = "0"

Q = "-1"

Q = "+1"

Q = "0"

Q = "+1"

Q="0"

Q = "MINUS"

Q = "PLUS"

Q="-1"

Q = "+1"

DESIGNATED VALUE Q IS NEGATIVE

DESIGNATED VALUE Q IS POSITIVE

Q = "-1"

Q = "+1"

ELECTRO-OPTICAL DEVICE, DRIVING METHOD THEREOF, AND ELECTRONIC APPARATUS WITH ADJUSTABLE RATIO BETWEEN POSITIVE AND NEGATIVE FIELD USING BLACK DISPLAY VOLTAGE

BACKGROUND

1. Technical Field

The present invention relates to an electro-optical device, a driving method thereof, and an electronic apparatus provided with the electro-optical device.

2. Related Art

As an example of an electro-optical device, a liquid crystal display device will be described.

In an active matrix type liquid crystal display device driving a pixel electrode by the use of a thin film transistor (hereinafter, referred to as a TFT), for example, an inversion driving scheme (alternating driving scheme) is generally adopted for inversing a polarity of a driving voltage applied to each pixel electrode in every scanning line or in every data line, or in every frame of an image signal so that the disadvantages of display such as the flicker or the burn-in of the display image are prevented.

It is expected that the disadvantages of display such as the flicker or the burn-in can be removed by employing the inversion driving scheme, because it is believed that application of a direct-current voltage component to the liquid crystal layer and deviation of charges between an element substrate and a counter substrate with the liquid crystal layer therebetween can be suppressed by employing the inversion driving scheme. However, the application of the direct-current voltage component cannot completely be removed by just performing the inversion driving. The disadvantages of display still exist.

That is, even though the inversion driving is performed, the application of the direct-current voltage to the liquid crystal layer or the deviation of charges between the element substrate and the counter substrate occurs. Therefore, countermeasures against these problems are required. In addition, the following two phenomena have been known as sources of those disadvantages of display.

A first phenomenon is a so-called field-through (also referred to as "push down") phenomenon which causes decrease in voltage of the pixel electrode connected to the drain terminal when the TFT is switched from an ON state to an OFF state. The field-through phenomenon is caused by parasitic capacitance between the gate and drain terminals of the TFT and between the source and drain terminals. Specifically, in this phenomenon, charges stored in a parasitic capacitor and in a storage capacitor are redistributed when the TFT is switched to the OFF state, which causes the pixel electrode to drop in the voltage thereof.

A second phenomenon relates to the direct-current voltage component caused by difference in characteristic between an element substrate and a counter substrate with the liquid crystal layer therebetween. More specifically, the element substrate with the pixel electrode or the TFT thereon and the counter substrate with the counter electrode thereon have electric characteristics in an asymmetric manner, so the deviation of charges between the element substrate and the counter substrate occurs.

In JP-A-2002-189460, a method of driving the liquid crystal display device paying attention to two phenomena described above is proposed.

In the driving method described in JP-A-2002-189460, a counter electrode potential serving as the basis for inversing the polarity in the inversion driving is shifted in advance in order to reduce the influence caused by the first phenomenon (field-through) and the second phenomenon (the electrical characteristic difference between the element substrate and the counter substrate).

Specifically, in an early stage, an amount of change in voltage caused by the first phenomenon and an amount of change in voltage caused by the second phenomenon are measured under predetermined measurement conditions, and a value obtained by adding these amounts is added to a set potential of the counter electrode as a correction voltage. The correction voltage is not variable, but fixed.

FIG. 27 is a plot illustrating a relation between a correction voltage and a driving voltage for a second phenomenon. According to experimental data obtained by inventors, since the correction voltage for the second phenomenon and the driving voltage has a correlative relationship to each other, the disadvantages of display, such as the flicker and the burn-in of the display image, occur in the known driving method disclosed in JP-A-2002-189460.

FIG. 27 is a plot illustrating an example of an experimental result obtained by the inventors, and shows the correlative relationship between the driving voltage (horizontal axis) and the correction voltage (vertical axis).

Here, the correction voltage at 10V of the driving voltage is −0.1V, the correction voltage at 5V becomes −0.05V, and the correction voltage at 0V becomes 0V.

That is, in the second phenomenon, the correction voltage depends on the driving voltage. Further, since the driving voltage is changed according to a gray scale to be displayed, the correction voltage which might depend on display contents may be changed between about −0.07V to 0V during performing display in a case where the peak voltage of the driving voltage is 7V.

In addition, a slope of the graph shown in FIG. 27 is applicable to another driving voltage. For example, when the peak voltage of the driving voltage is 15V, the correction voltage at 15V of the peak voltage becomes −0.15V (=−0.1×1.5).

Here, suppose that in the conventional technology the counter electrode potential is determined taking −0.04V as a constant correction voltage by summing up −0.01V of a correction voltage for the first phenomenon and −0.03V of a correction voltage for the second phenomenon.

First, when the driving voltage is 0V, the correction voltage for the second phenomenon should be 0V, but the correction voltage is set to be −0.04V. That means −0.03V of the excess correction voltage is applied as the direct-current voltage component.

In addition, when the driving voltage is 7V, the correction voltage for the second phenomenon should be −0.07V, but the correction voltage for the second phenomenon is set to be −0.03V. That means the differential voltage of −0.04V is applied as the direct-current voltage component. Here, the first phenomenon is considered to be canceled.

As such, in the known driving method in which the constant correction voltage is used to compensate the direct-current voltage components caused by the first phenomenon and the second phenomenon, application of the direct-current voltage to the liquid crystal layer is not fully suppressed, and the disadvantages of display such as the flicker still occur.

In the known driving method, the correction voltage obtained by adding the voltage change amounts of the first phenomenon and the second phenomenon is added to the counter electrode potential. However, when the correction voltage for the second phenomenon is larger than the correction voltage for the first phenomenon to some extent, the counter electrode potential is largely shifted to the positive or negative potential, which is acting as a cause for occurrence of the disadvantages of display.

Specifically, when the correction voltage for the second phenomenon is large, the amplitude difference between the positive and negative driving voltages increases. For this reason, the disadvantages of display such as the flicker occur.

SUMMARY

An advantage of some aspects of the invention is to solve at least a part of the above-mentioned problems.

According to a first aspect of the invention, there is provided a method of driving an electro-optical device which includes a plurality of scanning lines, a plurality of data lines, a switching transistor and a pixel electrode which are provided at an intersection between one of the scanning lines and one of the data lines, a counter electrode opposite to the pixel electrode, and an electro-optical layer interposed between the pixel electrode and the counter electrode, the method comprising; supplying a data signal alternately having a positive voltage and a negative voltage to the pixel electrode through the one of the data line provided that the positive voltage is of a potential greater than a counter electrode potential applied to the counter electrode and that the negative voltage is of a potential lower than the counter electrode potential; setting the counter electrode potential to reduce a flicker; in a predetermined period which comprises a first period and a second period, supplying a first voltage that is one of the positive voltage and the negative voltage to the pixel electrode in the first period; and supplying a second voltage that is the other of the positive voltage and the negative voltage to the pixel electrode in the second period. Here, a ratio of a length of the first period to a length of the second period is variable in the predetermined period.

According to such a driving method, first, since the counter electrode potential is shifted and set in advance such that the flicker is reduced, the correction for the first phenomenon is implemented.

According to the knowledge from the experimental data obtained by the inventors, the correlative relationship between the correction voltage and the driving voltage is recognized also in the first phenomenon, but it is known that the correlation between the correction voltage and the driving voltage in the first phenomenon is weak compared with that of the second phenomenon. As shown in FIG. 27, for the second phenomenon, the correction voltage is 0V when the driving voltage is 0V, but a correction voltage for the first phenomenon is not 0V even though the driving voltage is 0V. Therefore, it is preferable that some constant correction voltage is applied regardless of the driving voltage to compensate the first phenomenon.

Furthermore, the ratio of the negative voltage to the positive voltage applied during one frame can be adjusted because the ratio of a period length of the first field to a period length of the second field in a period length of one frame is variable.

That is, the correction for the second phenomenon can be performed by adjusting the ratio of the period length of the first field to the period length of the second field according to the direction and the amplitude of the direct-current voltage caused by the characteristic difference.

In addition, since a shift amount of the counter electrode potential set in advance corresponds only to an amount of the correction voltage with respect to application of the direct-current voltage component generated by the first phenomenon, it is possible to suppress the direct-current voltage component from being applied to the liquid crystal layer.

Accordingly, it is possible to provide the method of driving the electro-optical device which can suppress the disadvantages of display such as the flicker or the burn-in of the display image compared with the known driving method.

In the driving method, it is preferable that the predetermined period corresponds to one frame, one frame comprises a first field and a second field, the first field corresponds to the first period, and the second field corresponds to the second period.

Further, it is preferable that, in one of the first field and the second field, the ratio of a period length of the first field to a period length of the second field in one frame is adjusted by supplying a third voltage as the data signal to the data line during a predetermined period.

Further, it is preferable that the third voltage is a voltage corresponding to a black display.

In the driving method, preferably, in a case where N scanning lines are provided, a first scanning line group is set from a first scanning line to an Mth scanning line, and a second scanning line group is set from an (M+1)th scanning line to an Nth scanning line, any one scanning line of the first scanning line group and any one scanning line of the second scanning line group are alternately selected over one frame. In the first field, the first voltage is applied to a pixel electrode corresponding to a scanning line that belongs to the first scanning line group and the second voltage is applied to a pixel electrode corresponding to a scanning line that belongs to the second scanning line group. In the second field, the second voltage is applied to the pixel electrode corresponding to the scanning line that belongs to the first scanning line group and the first voltage is applied to the pixel electrode corresponding to the scanning line that belongs to the second scanning line group.

Further, it is preferable that the predetermined period corresponds to a plurality of frames which comprises two or more successive frames, and a ratio of a period length applied with the positive voltage to a period length applied with the negative voltage is variable in the predetermined period.

According to a second aspect of the invention, there is provided an electro-optical device which includes: a plurality of scanning lines; a plurality of data lines; a switching transistor and a pixel electrode which are provided at an intersection between one of the scanning lines and one of the data lines; a counter electrode opposite to the pixel electrode; and an electro-optical layer interposed between the pixel electrode and the counter electrode, wherein a data signal alternately having a positive voltage and a negative voltage is supplied to the pixel electrode through the one of the data line provided that the positive voltage is of a potential greater than a counter electrode potential applied to the counter electrode and that the negative voltage is of a potential lower than the counter electrode potential, wherein the counter electrode is supplied with a counter electrode potential set to reduce a flicker, wherein in a predetermined period which comprises a first period and a second period, a first voltage that is one of the positive voltage and the negative voltage is supplied to the pixel electrode in the first period, and wherein a second voltage that is the other of the positive voltage and the negative voltage is supplied to the pixel electrode in the second period, the electro-optical device further comprising a control circuit adjusting a ratio of a length of the first period to a length of the second period in the predetermined period.

According to a third aspect of the invention, there is provided an electronic apparatus including the electro-optical device of the first aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
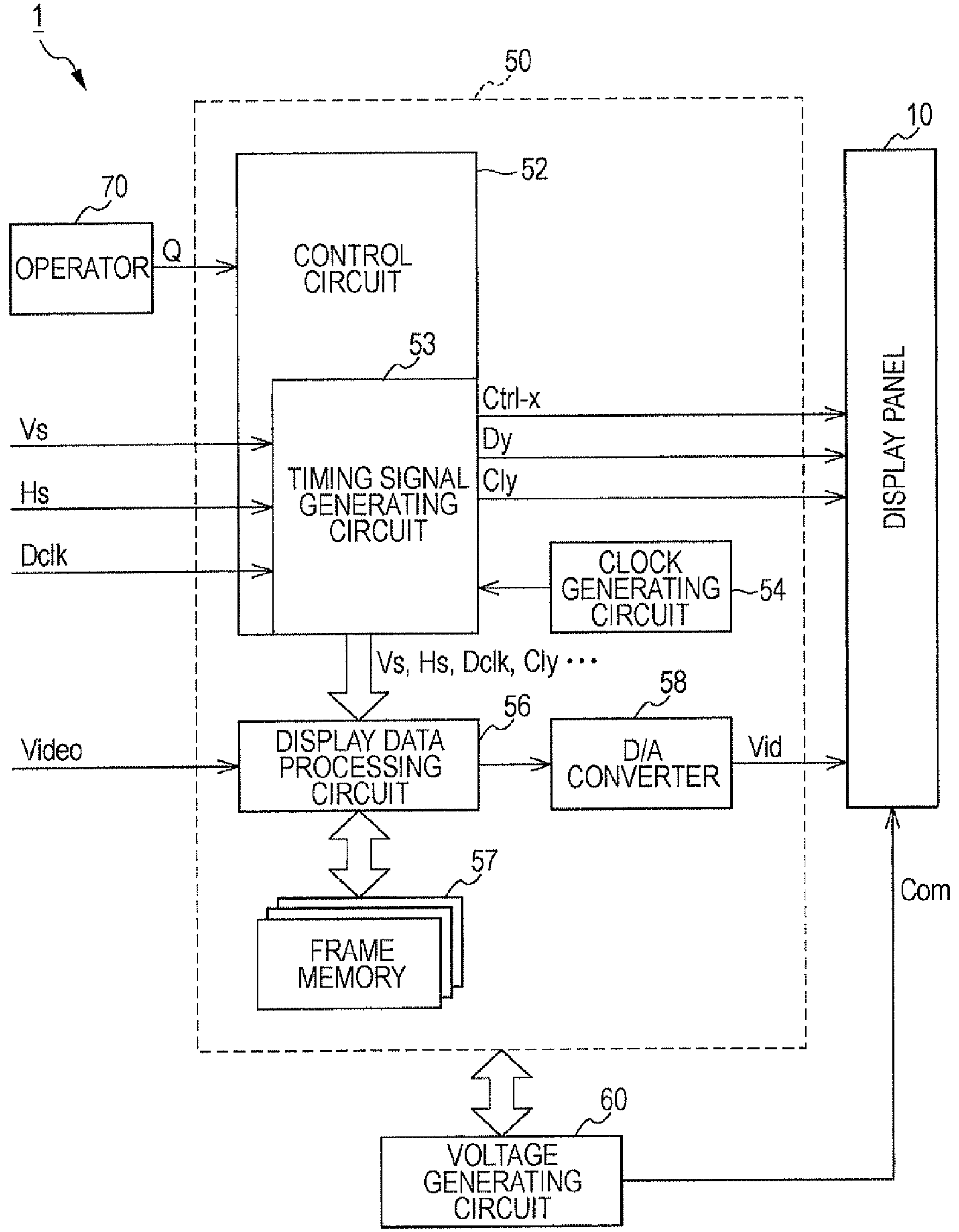
FIG. 1 is a view schematically illustrating an electro-optical device according to a first embodiment.

Hereinafter, embodiments of the invention will be described with reference to the accompanying drawings. In the drawings, sizes or scales of layers and members are shown properly different from actual ones so as to recognize the layers and the members in the drawings.

First Embodiment

Schematic Configuration of Electric Device

FIG. 1 is a view schematically illustrating an electro-optical device according to this embodiment.

First, a schematic configuration of an electro-optical device 1 according to the first embodiment of the invention will be described with reference to FIG. 1.

The electro-optical device 1 includes a display panel 10, a processing circuit 50, a voltage generating circuit 60, and an operator 70.

The display panel 10 is a transmissive active matrix type liquid crystal panel, and details of which will be described later.

The processing circuit 50 includes a control circuit 52 and a display data processing circuit 56, and is a circuit module controlling operations of the display panel 10 and the like according to an output of a data signal Vid. In addition, the processing circuit 50 is connected to the display panel 10 via, for example, a flexible printed circuit (FPC) substrate.

The control circuit 52 has a timing signal generating circuit 53 built therein, and a clock generating circuit 54 is attached to the timing signal generating circuit 53.

The clock generating circuit 54 generates a clock signal serving as the basis for controlling the operations of each unit, and outputs the clock signal to the timing signal generating circuit 53.

The timing signal generating circuit 53 generates various kinds of control signals for controlling the display panel 10 in synchronization with a vertical synchronization signal Vs, a horizontal synchronization signal Hs, and a dot clock signal Dclk, and all of which are supplied from an external device (not shown).

The control circuit 52 controls the timing signal generating circuit 53, the display data processing circuit 56 and the voltage generating circuit 60 to be described later, and the like.

The voltage generating circuit 60 includes a DC/DC converter and the like, and receives direct-current power supplied from the external device to generate plural direct-current voltages to be used in each unit. In addition, the voltage generating circuit 60 generates a counter electrode potential Com which is applied to a counter electrode of the display panel 10 and is supplied to the display panel 10.

The operator 70 is operated by a user or the like, and outputs a designated value Q in a range of, for example, "+10" to "−10" according to the operation. Specifically, for example, when being mounted on an electronic apparatus or the like, the operator 70 can be operated by an operation unit such as an operation panel thereof or by a remote controller. An output timing of a start pulse Dyb is moved forward or backward according to the designated value Q, which will be described later.

A frame memory 57 and a D/A converter 58 are attached to the display data processing circuit 56.

The display data processing circuit 56 stores display data Video supplied from the external device in the frame memory 57 being controlled by the control circuit 52, then reads the display data in synchronization with a driving of the display panel 10, and converts the display data into an analogue data signal Vid (a driving voltage) using the D/A converter 58.

The display data Video defines gray scale of pixels in the display panel 10. Supplying the display data Video for one frame is triggered by the vertical synchronization signal Vs, and supplying the display data Video for one row is triggered by the horizontal synchronization signal Hs.

Here, the vertical synchronization signal Vs according to this embodiment is a signal having a frequency of 60 Hz (a period of 16.7 ms), but the invention is not limited thereto. In addition, it is assumed that the dot clock signal Dclk defines a period for supplying data for one pixel among the display data Video. That is, the control circuit 52 controls each unit in synchronization with supplying of the display data Video.

Configuration of Display Panel

Figure 2:
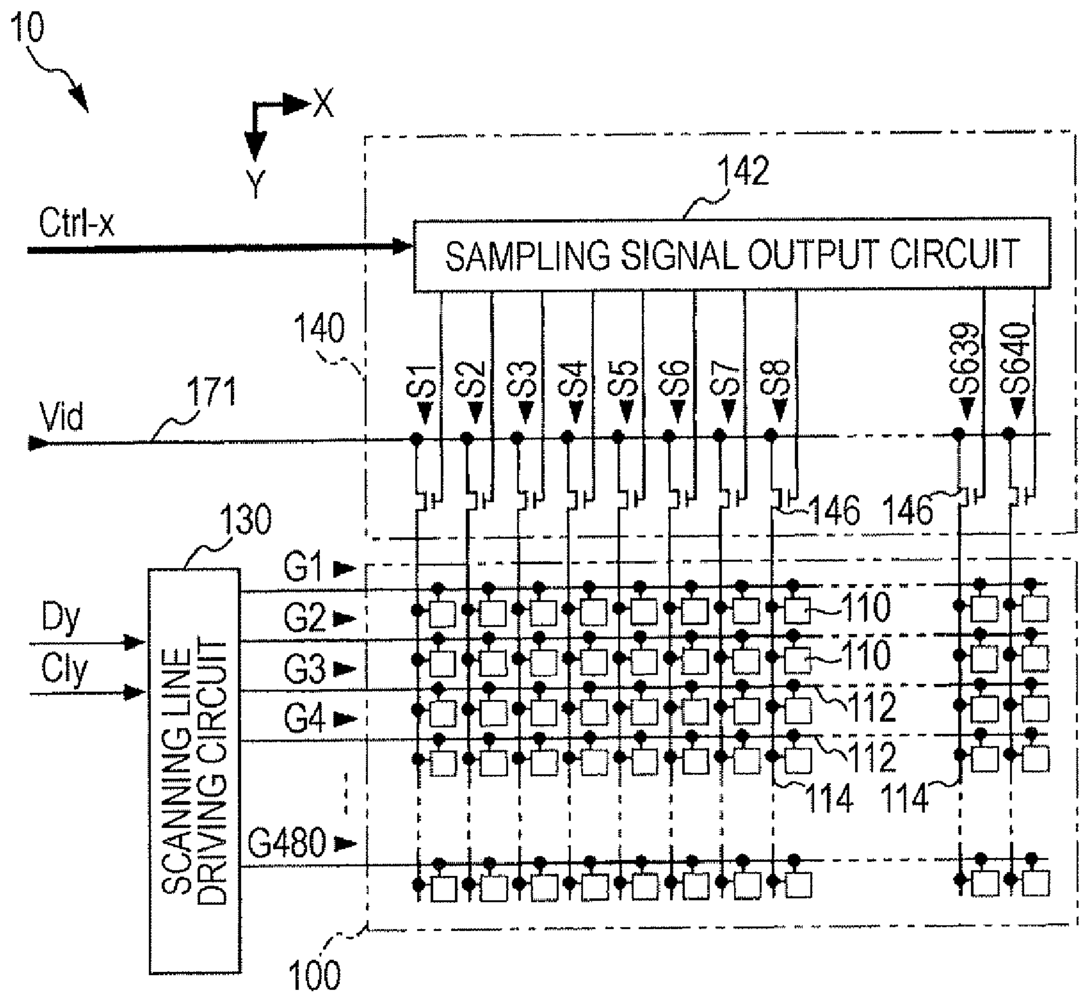
FIG. 2 is a view illustrating a configuration of a display panel.
Figure 3:
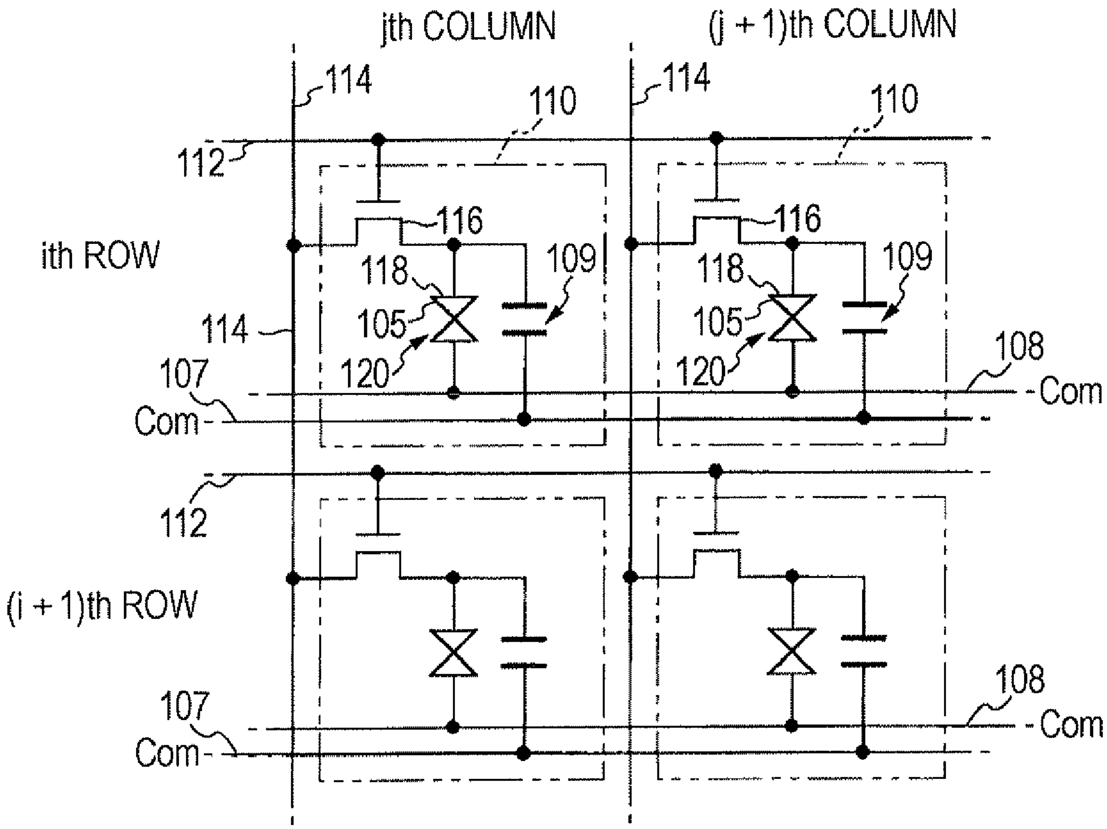
FIG. 3 is a view illustrating an equivalent circuit to a pixel.

FIG. 2 is a view illustrating a configuration of the display panel 10. FIG. 3 is a view illustrating an equivalent circuit of a pixel. Next, the configuration of the display panel 10 will be described.

As shown in FIG. 2, the display panel 10 has a scanning line driving circuit 130 and a data line driving circuit 140 built therein in the vicinity of a display area 100.

In the display area 100, there are provided with scanning lines 112 of 480 rows to extend in a row (X) direction and also there are provided with the data lines 114 of 640 columns to extend in a column (Y) direction and to be electrically insulated from the respective scanning lines 112, respectively.

A pixel 110 is formed in correspondence with an intersection between one of the scanning lines 112 of 480 rows and one of the data lines 114 of 640 columns. In other words, plural pixels 110 are disposed in a "480×640" matrix shape.

In this embodiment, for convenience of explanation, a resolution is represented with the video graphics array (VGA). However, the invention is not limited thereto, and the extended graphics array (XGA) or the super-XGA (SXGA) may be employed as the resolution.

FIG. 3 shows a configuration of "2×2" pixels, that is, 4 pixels in total which corresponds to intersections between an ith row and an (i+1)th row adjacent to the ith row under by one row and a jth column and a (j+1)th column adjacent to the jth column rightward by one column. In addition, i and (i+1) represent the rows at which the pixels 110 are disposed, which are integers in range of 1 to 480, in this case. In addition, j and (j+1) represent the columns at which the pixels 110 are disposed, which are integers in a range of 1 to 640, in this case.

The plural pixels 110 each includes an n-channel type TFT 116 and a liquid crystal capacitor 120.

Here, since the respective pixels 110 have the same configuration, the pixel 110 located on the "i×j" intersection will be described typically.

A gate electrode of the TFT 116 of pixel 110 located on the "i×j" intersection is connected to the ith scanning line 112, a source electrode thereof is connected to the jth data line 114, and a drain electrode thereof is connected to a pixel electrode 118 which is one end of the liquid crystal capacitor 120.

The other end of the liquid crystal capacitor 120 is connected to a counter electrode 108. The counter electrode 108 is provided in common over the entire pixels 110, which is applied with the counter electrode potential Com which is constant temporally. In addition, the counter electrode potential Com is set to a value which is shifted from a reference value by a correction voltage compensating a direct-current voltage component in the first phenomenon described above, and details of which will be described later.

The display panel 10 is provided such that a pair of an element substrate and a counter substrate is bonded to each other with a constant gap therebetween, and liquid crystal is sealed in the gap, which is not shown in the drawing. Here, on the element substrate, the scanning lines 112, the data lines 114, the TFTs 116 and the pixel electrodes 118 are formed together with the scanning line driving circuit 130 and the data line driving circuit 140, the counter electrodes 108 are formed on the counter substrate, and these electrode formed surfaces are bonded to each other with a constant gap therebetween so as to face to each other.

For this reason, the liquid crystal capacitors 120 are formed such that the pixel electrodes 118 and the counter electrodes 108 interpose liquid crystal 105.

In this embodiment, it is assumed that a normally white mode is set. In this mode, when an effective voltage value held in the liquid crystal capacitor 120 approximates zero, a transmittance of light passing through the liquid crystal capacitor is maximized to display a white color. On the other hand, as the effective voltage value increases, an amount of transmitted light decreases, and finally a black color having the minimum transmittance is displayed.

In this configuration, when a selection voltage is applied to one of the scanning line 112, which causes the TFT 116 to be in an ON (conduction) state, and a data signal of a voltage corresponding to gray scale (brightness) is supplied to the pixel electrode 118 through the data line 114 and the TFT 116 in the ON state, the effective voltage value corresponding to the gray scale can be held in the liquid crystal capacitor 120 located on the intersection between the scanning line 112 applied with the selection voltage and the data line 114 supplied with the data signal.

Further, when the scanning line 112 is released from the selection voltage, the TFT 116 becomes an OFF (non-conduction) state. However, at this time, since an off resistance value is not an ideal infinite value, some of the charges held in the liquid crystal capacitor 120 will leak. In order to reduce the influence of the off leak, storage capacitors 109 are formed on the respective pixels. One end of each storage capacitor 109 is connected to the pixel electrode 118 (a drain of the TFT 116), and the other end thereof is connected to a capacitor line 107 in common over the entire pixels. The capacitor line 107 is held to a temporally constant potential, for example, the counter electrode voltage Com similar to the counter electrode 108.

Returning to FIG. 2, the scanning line driving circuit 130 serves to supply scanning signals G1, G2, G3, . . . , and G480 to the scanning lines 112 of 1st, 2nd, 3rd, . . . , and 480th rows, respectively. The scanning line driving circuit 130 sets the scanning signal applied to the selected scanning line to be an H level corresponding to a voltage Vdd, and scanning signals applied to other scanning lines to be an L level corresponding to the non-selection voltage (a ground voltage Gnd).

The data line driving circuit 140 includes a sampling signal output circuit 142 and n-channel type TFTs 146 which are provided to correspond to the data lines 114, respectively. The data line driving circuit 140 supplies a data signal (a driving voltage) to each pixel in the selected scanning line to define the gray scale of the corresponding pixel, which will be described later.

Driving Method 1: Scanning Lines Sequence

First, details of the driving method of the invention will be described with reference to FIG. 27.

As described above, the first phenomenon relates to the drop in voltage caused by a field-through phenomenon, which can be corrected by compensating a direct-current voltage corresponding to an amount of the drop in voltage.

On the other hand, the second phenomenon relates to deviation of charges, which is caused by difference in electrical characteristic between a pixel electrode substrate and a counter electrode substrate. In order to compensate this phenomenon, it is necessary to apply an additional direct-current voltage enough to compensate the deviation of charges.

Figure 27:
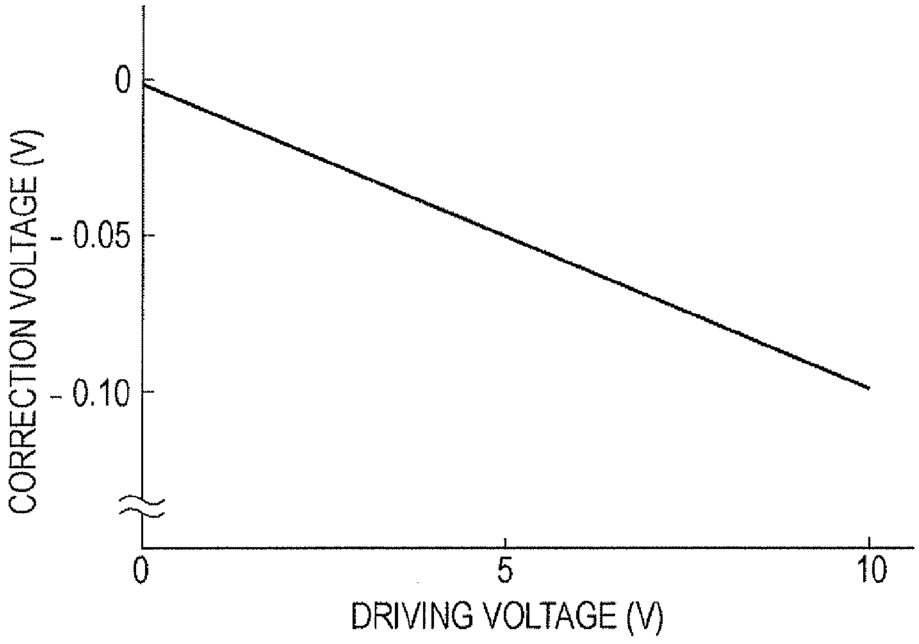
FIG. 27 is a view illustrating a relation between a correction voltage and a driving voltage in a second phenomenon.

In addition, as described above, the inventors have found out the correlation between the correction voltage for the second phenomenon and the driving voltage, as shown in FIG. 27.

After considering carefully on the basis of the experimental data, the inventors have come up with the idea that it is effective to separately perform the corrections of the first phenomenon and the second phenomenon.

That is, a constant correction voltage is applied regardless of the driving voltage to correct the first phenomenon, and a ratio of a period length holding a positive polarity to a period length holding a negative polarity is adjusted to correct the second phenomenon according to a direction and a magnitude of the direct-current voltage component caused by the difference in characteristic. The driving methods according to the embodiments to be described below is created after careful consideration and study in order to specifically implement the idea made up by the inventors.

Figure 4:
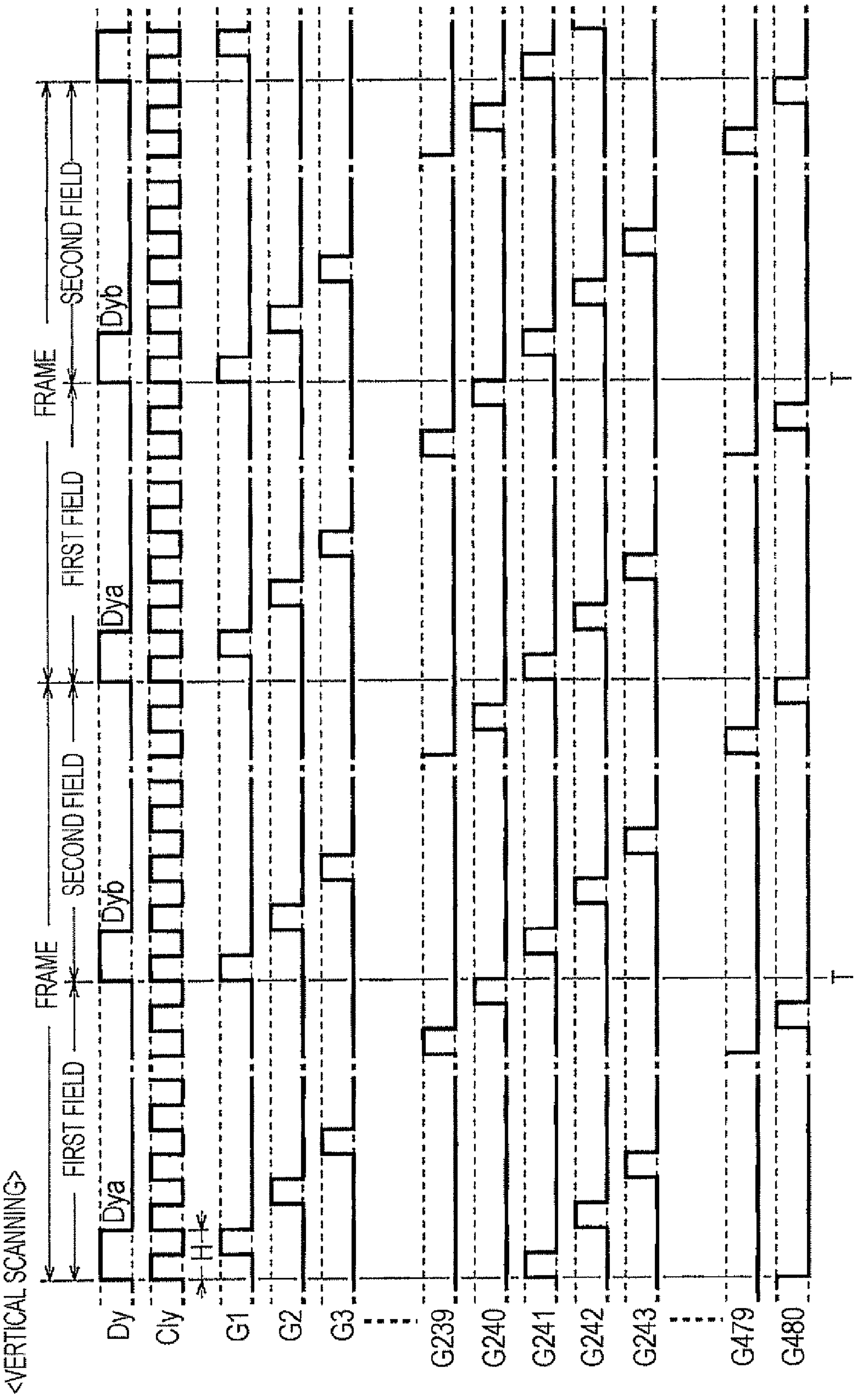
FIG. 4 is a view illustrating a timing chart of a scanning signal sequence when a designated value is "0".
Figure 5:
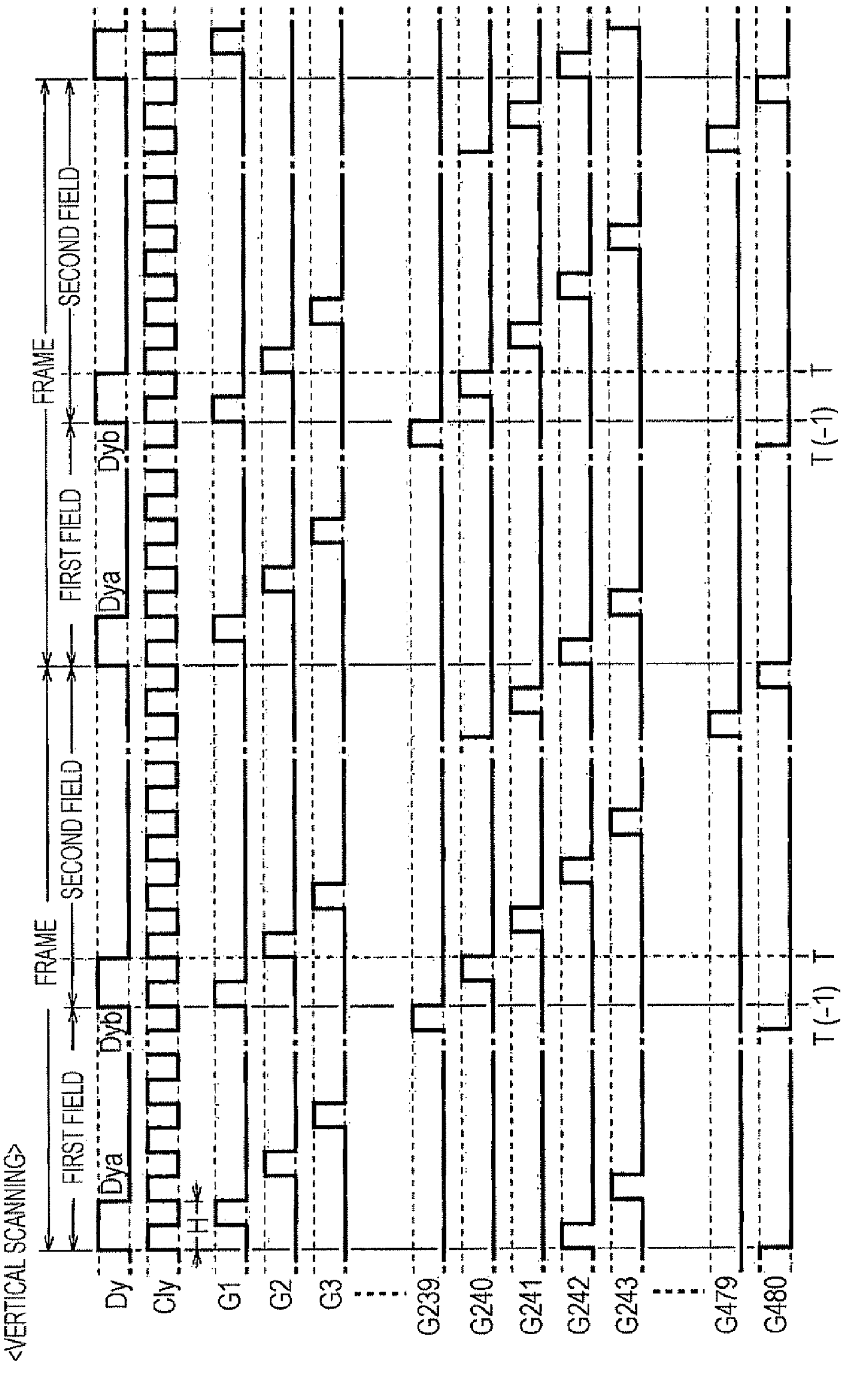
FIG. 5 is a view illustrating a timing chart of a scanning signal sequence when a designated value is "−1".
Figure 6:
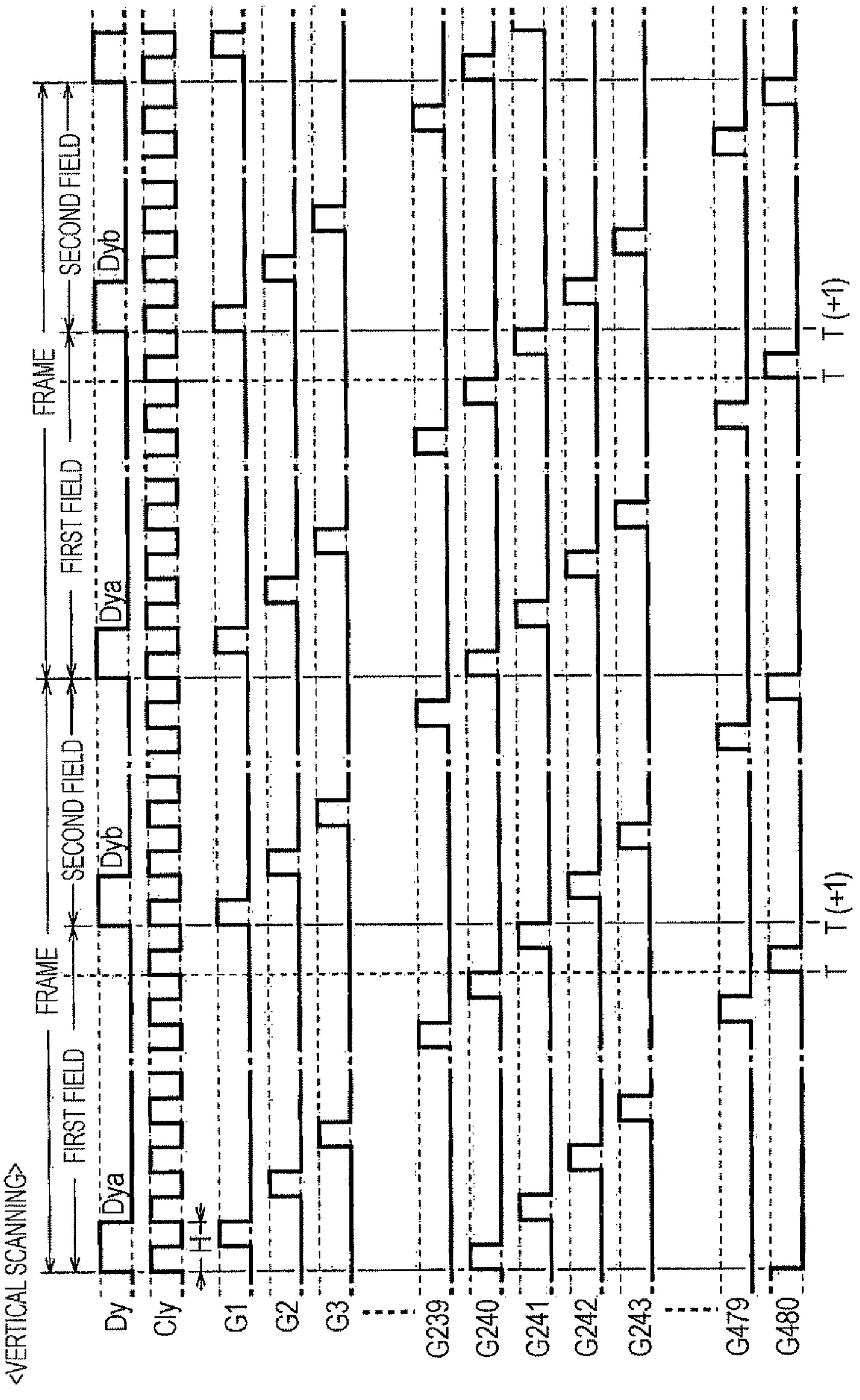
FIG. 6 is a view illustrating a timing chart of a scanning signal sequence when a designated value is "+1".

FIG. 4 is a timing chart of a scanning signal sequence when a designated value is "0". FIG. 5 is a timing chart of the scanning signal sequence when the designated value is "−1". FIG. 6 is a timing chart of the scanning signal sequence when the designated value is "+1".

Here, the method of driving the electro-optical device according to this embodiment will be specifically described focusing on FIGS. 4 to 6 while referencing to FIGS. 1 to 3 properly.

In addition, this embodiment employs a so-called double-speed area scanning inversion driving scheme. In this driving scheme, plural scanning lines are classified into a first scanning line group and a second scanning line group, one scanning line of the first scanning line group and one scanning line of the second scanning line group are alternately selected in one frame, and each scanning line is selected twice in every frame.

First, the driving method of the scanning lines will be described now.

FIG. 4 is a timing chart illustrating the scanning signals G1 to G480 output from the scanning line driving circuit 130 in the relation with start pulses Dya and Dyb and the clock signal Cly.

In FIG. 4, the frame means a period necessary to display one image on the display panel 10. In one frame, it is assumed that a first field is a period from the output of the start pulse Dya to the output of the start pulse Dyb, and a second field is a period from the output of the start pulse Dyb to the output of the next start pulse Dya. In addition, one scanning line 112 is selected one time in every field, that is, two times in total in one frame.

As described above, since the vertical synchronization signal Vs in this embodiment has a frequency of 60 Hz, the period of one frame is fixed to be 16.7 ms. The control circuit 52 (see FIG. 1) outputs the clock signal Cly of which duty ratio is 50% for 480 periods equal to the number of the scanning lines over the period of one frame. In addition, the period of one cycle of the clock signal Cly is denoted by "H".

The control circuit 52 outputs the start pulses Dya and Dyb having a pulse width corresponding to one cycle of the clock signal Cly when the clock signal Cly rises to the H level, as described below.

That is, the control circuit 52 outputs the start pulse Dya at the beginning of the period of one frame (at the beginning of the first filed). On the other hand, when the designated value Q set by the operator 70 is "0", the control circuit 52 outputs the start pulse Dyb at the timing T after outputting the clock signal Cly for 240 periods since the start pulse Dya is output (that is, a half period of one frame is lapsed). In addition, when the designated value Q is a negative value, the start pulse Dyb is output at timing earlier than the timing T by "−Q×H", and when the designated value Q is a positive value, the start pulse Dyb is output at timing later than the timing T by "Q×H".

As shown in FIG. 5, for examples when the designated value Q is "−1", the start pulse Dyb is output at the timing T(−1) leading from the timing T by one period of the clock signal Cly.

In addition, as shown in FIG. 6, when the designated value Q is "+1", the start pulse Dyb is output at the timing T(+1) lagging from the timing T by one period of the clock signal Cly.

Here, the start pulses Dya and Dyb are alternately output, and the output timing of the start pulse Dya is not changed regardless of the designated value Q. Therefore, when the start pulse Dya which is output at every frame (16.7 ms) is specified, it is possible to necessarily specify also the start pulse Dyb defining a start timing of the second field. For this reason, in FIG. 1 and in FIGS. 4 to 6, the start pulses Dya and Dyb are not distinguished from each other, but being denoted as the start pulse Dy.

The scanning line driving circuit 130 outputs the scanning signals G1 to G480 from the start pulses Dya and Dyb and the clock signal Cly as follows:

That is, when being supplied with the start pulse Dya, the scanning line driving circuit 130 sequentially set one of the scanning signals G1 to G480 in the H level every time the clock signal Cly descends to the L level. On the other hand, when being supplied with the start pulse Dyb, the scanning line driving circuit 130 sequentially set one of the scanning signals G1 to G480 in the H level every time the clock signal Cly ascends to the H level.

Since the start pulse Dya is supplied at the beginning of the period (the first field) of one frame, the scanning line selection triggered by the supply of the start pulse Dya is not changed by the designated value Q.

In addition, the scanning line selection triggered by the start pulse Dya is performed in the period in which the clock signal Cly is in the L level. Therefore, the scanning line selection is performed in a half cycle of the clock signal Cly over the first and second fields in a sequence of 2nd, 3rd, 4th, . . . , 480th rows from the scanning line of the 1st row as a start point along a descent direction on a screen.

On the other hand, since the start pulse Dyb is supplied at the beginning of the second field, the scanning line selection triggered by the start pulse Dyb moves forward or backward as a whole by the designated value Q. That is, the scanning line selection triggered by the supply of the start pulse Dyb is performed in the period in which the clock signal Cly is in the H level. Therefore, between the selections triggered by the start pulse Dya, the scanning line selection is performed from the second field of a frame to the first field of the next frame in a sequence of 2nd, 3rd, 4th, . . . , 480th rows from the scanning line of the 1st row as a start point along a descent direction on a screen.

That is, when the designated value Q is "−1", as shown in FIG. 5, the selection of the 1st to 240th rows in the second field of a frame moves forward as a whole by one cycle of the clock signal Cly from the timing T, and when the designated value Q is "+1", as shown in FIG. 6, the selection moves backward as a whole by one cycle of the clock signal Cly from the timing T.

Driving Method 2: Data Lines Sequence

Figure 7:
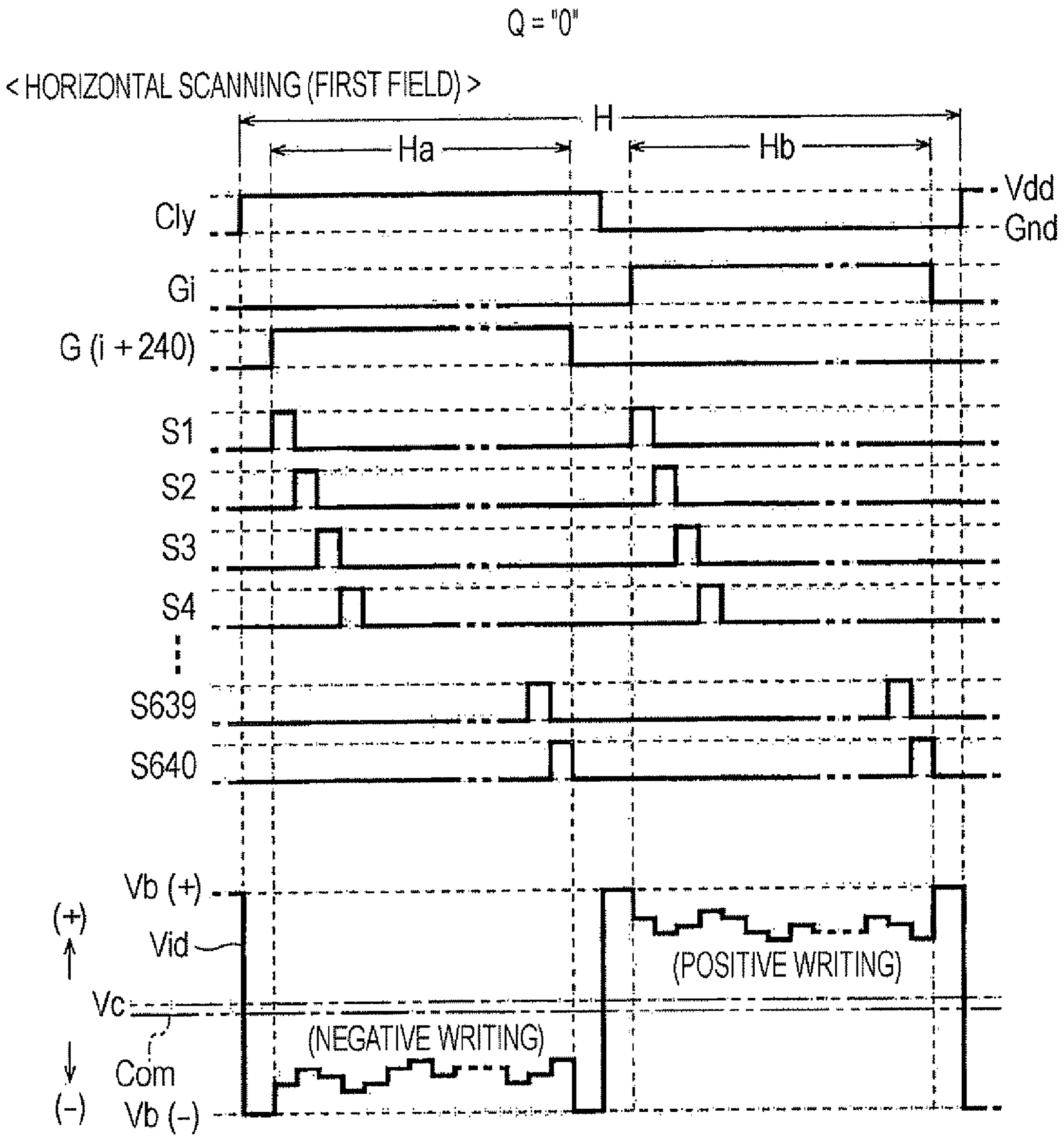
FIG. 7 is a view illustrating a timing chart in a first field of a data signal sequence.
Figure 8:
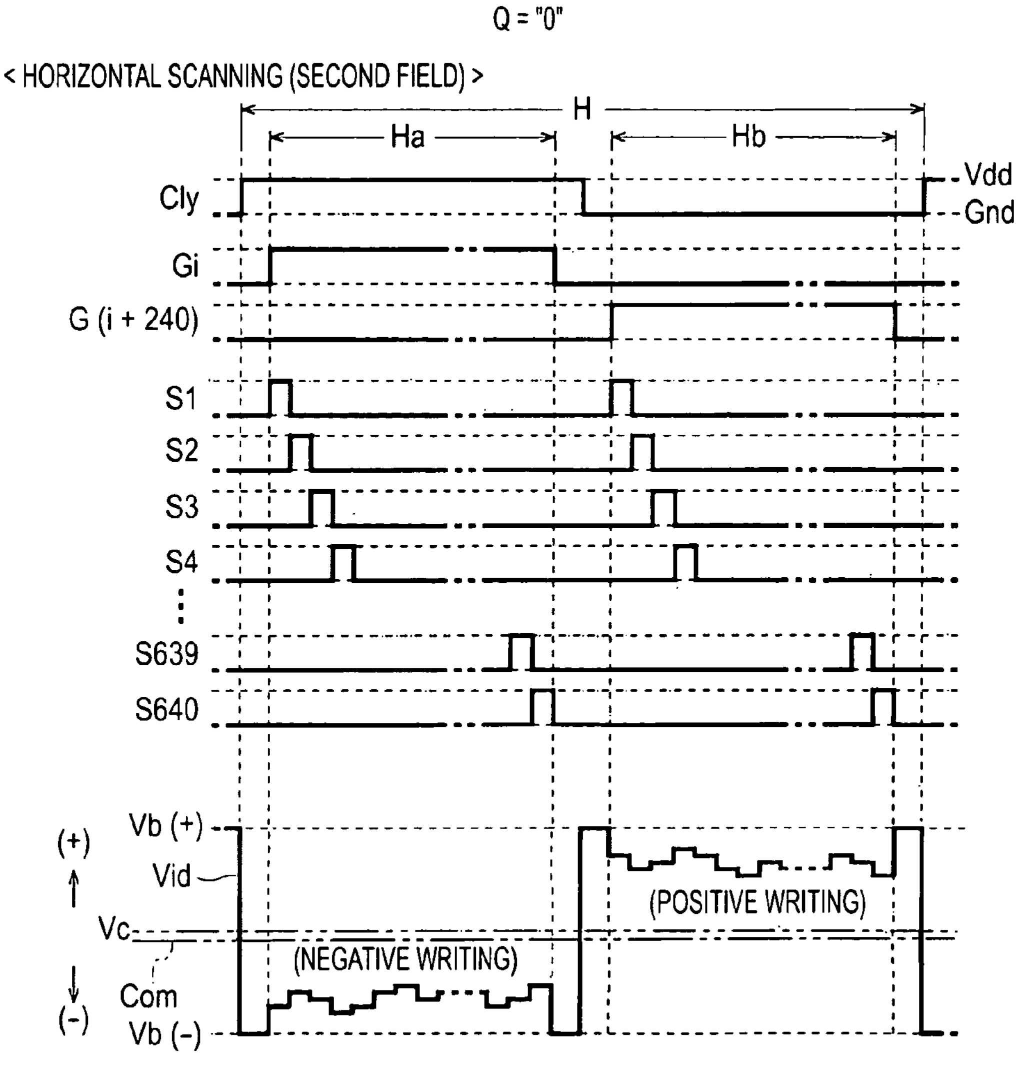
FIG. 8 is a view illustrating a timing chart in a second field of a data signal sequence.

FIG. 7 is a view illustrating a timing chart in the first field of a data signal sequence. FIG. 8 is a view illustrating a timing chart in the second field of the data signal sequence.

Then, the driving method of the data lines will be described focusing on FIGS. 7 and 8 while referencing to FIGS. 1 to 3 properly.

As shown in FIG. 7 or 8, during the period of time when the scanning line 112 is selected and the scanning signal supplied to the selected scanning line is in the H level, the sampling signal output circuit 142 of the data line driving circuit 140 outputs the sampling signals S1, S2, S3, . . . , and S640, which sequentially and exclusively is switched to the H level, to the data lines 114, respectively, according to a control signal Ctrl-x from the control circuit 52. In addition, the control signal Ctrl-x is actually the start pulse or the clock signal, and the explanation thereof will be omitted.

As shown in FIG. 7 or 8, the periods Ha and Hb in which the scanning signal is set to the H level are slightly narrower than the period of the half cycle of the clock signal Cly.

FIGS. 7 and 8 show the case where the designated value Q is "0".

In this case, in the first field as shown in FIG. 7, the scanning signal Gi ascends to the H level after the scanning signal G(i+240) ascends to the H level.

In addition, in the second field as shown in FIG. 8, the scanning signal G(i+240) ascends to the H level after the scanning signal Gi ascends to the H level.

The display data processing circuit 56 shown in FIG. 1 converts the display data Video corresponding to the pixels of one row in the selected scanning line 112 into the data signal Vid having a polarity, which will be described later, according to the output of the sampling signals S1 to S640 supplied from the sampling signal output circuit 142.

That is, the display data processing circuit 56 converts the data signal Vid of the pixel in the pixel row which is selected at the L level of the clock signal Cly into a positive (+) signal, and converts the data signal Vid of the pixel in the pixel row which is selected at the H level of the clock signal Cly into a negative (−) signal. In other words, the display data processing circuit 56 converts the data signal Vid of the pixel in the selected pixel row, selection of which is triggered by the start pulse Dya, into the positive (+) signal, and converts the data signal Vid of the pixel in the selected pixel row, selection of which is triggered by the start pulse Dyb, into the negative (−) signal.

As shown in FIGS. 7 and 8, it is assumed that the positive (+) signal is a potential greater than a reference voltage Vc, and the negative (−) signal is a potential lower than the reference voltage Vc. In this case, the reference voltage Vc is set to 0 V, but the invention is not limited thereto.

Here, one advantage of the driving method of the invention is to set the counter electrode potential Com to be shifted on the negative (−) side from the reference voltage Vc.

Specifically, the counter electrode potential Com is set to a voltage value in a range of, for example, about from −0.1 V to −0.2 V. This is because since an amount of change in voltage caused by the above-mentioned first phenomenon (field-through) is in a range about from −0.1 V to −0.2 V, the counter electrode potential Com is shifted to this range from the reference voltage Vc to correct the first phenomenon.

In addition, since the TFT 116 is of the n-channel type, the negative correction voltage is used to correct the first phenomenon, but the invention is not limited thereto as long as the counter electrode potential Com is shifted so as to reduce the influence caused by the first phenomenon.

The above description is made on the basis of the knowledge from the experimental data obtained by the inventors. In addition, it is preferable that the correction voltage for the first phenomenon be measured in each display panel. Specifically, it is preferable to proceed with the following process. First, measure the counter electrode potential Com at which the flicker is reduced sufficiently under a condition that a positive and negative driving voltages corresponding to the same gray scale are applied alternately. Here, it is preferable that the driving voltage is a voltage corresponding to intermediate gray scale because the flicker can be easily recognized. Next, calculate the correction voltage from the difference between the counter electrode potential Com and the reference voltage Vc.

In this way, the correction voltage is obtained to be implemented to the control circuit 52 (see FIG. 1) or to the voltage generating circuit 60. The voltage generating circuit 60 generates the counter electrode potential Com shifted by the correction voltage, which is supplied to the counter electrode of the display panel 10.

Driving Method 3: Details

Next, details of the driving method will be described now.

Here, an operation in a case where the designated value Q is "0" will be described, and then an operation in a case where the designated value Q is set to a value other than "0" by the use of the operator 70 will be described.

First, in FIG. 1, the control circuit 52 stores the display data video, which is supplied from the external device, in the frame memory 57. Thereafter, when a scanning line of a pixel row is selected in the display panel 10, the control circuit 52 reads the display data of the corresponding pixel row at a speed 2 times the storage speed. Then, the display data is converted into the analogue data signal Vid by the D/A converter 58. The control circuit 52 controls the sampling signal output circuit 142 through the control signal Ctrl-x in order that the sampling signals S1 to S640 ascend to the H level in synchronization with the reading out of the display data.

As shown in FIG. 4, when the designated value Q is "0", the scanning lines are selected in the sequence of 241st, 1st, 242nd, 2nd, 243rd, 3rd, . . . , 480th, and 240th rows in the first field.

For this reason, the control circuit 52 controls the scanning line driving circuit 130 such that the scanning line of the 241st row is selected at first, and makes the display data processing circuit 56 to read the display data Video corresponding to the 241st row stored in the frame memory 57 at the double speed. Then, the control circuit 52 makes the D/A converter 58 to generate the negative data signal Vid, and controls the sampling signal output circuit 142 such that the sampling signals S1 to S640 ascend sequentially and exclusively to the H level according to the reading of the data signal Vid, as shown in FIG. 7. When the sampling signals S1 to S640 ascend sequentially to the H level, the TFTs 116 are sequentially turned on, and thus the data signal Vid supplied to the pixel signal line 171 is sampled for the data lines of the 1st to 640th rows.

On the other hand, when the scanning line is selected, the scanning signal G241 ascends to the H level, and thus all TFTs of the pixels 110 located on the 241st row are turned on.

Therefore, the negative voltage of the data signal Vid sampled for the data lines is applied to the pixel electrodes 118 without any change. For this reason, in the 241st row, the negative voltage according to the gray scale designated by the display data Video is written to and held on the liquid crystal capacitors 120 of the pixels in the 1st, 2nd, 3rd, 4th, . . . , 639th, and 640th columns.

Hereinafter, in the first field, the operation of the same voltage writing is performed in the sequence of the 1st, 242nd, 2nd, 243rd, 3rd, . . . , 480th, and 240th rows. Therefore, the positive voltage according to the gray scale is written to the pixels of the 1st to 240th rows, the negative voltage according to the gray scale is written to the pixels of the 241st to 480th rows, and all of which are held on the respective pixels.

In addition, in the second field, the scanning lines are selected in the sequence of the 1st, 241st, 2nd, 242nd, 3rd, 243rd, 4th, 244th, . . . , 240th, and 480th rows, and the polarity of the driving voltage thereof is inversed in the same row.

For this reason, the negative voltage according to the gray scale is written to the pixels of the 1st to 240th rows, and the positive voltage according to the gray scale is written to the pixels of the 241st to 480th rows, and all of which are held on the respective pixels.

FIG. 7 shows an example of a voltage waveform of the data signal Vid in the period in which the scanning line of the (i+240)th row and the scanning line of the ith row in the first field are selected.

In FIG. 7, the voltages Vb(+) and Vb(−) represent the positive and negative voltages which correspond to the black color of the lowest gray scale, respectively, and both of which are in the symmetric relation about the reference voltage Vc.

When a decimal value corresponding to the gray scale value designated by the display data Video is "0", the black color of the lowest gray scale is designated, and thereafter when a bright gray scale is designated as the decimal value increases, since this embodiment employs the normally white mode, the voltage of the data signal Vid is changed from the voltage Vb(+) to a lower potential as the gray scale value increases in a case where the data signal is converted into the positive polarity, and is changed from the voltage Vb(−) to a higher potential in a case where the data signal is converted into the negative polarity.

In the first field, since the scanning line of the (i+240)th row is selected earlier than that of the ith row, for example, in the period of the H level of the sampling signal S1 during the period in which the scanning signal G(i+240) is in the H level, the data signal Vid becomes the negative voltage corresponding to the gray scale of the "i×1" pixel, and thereafter, is changed to the negative voltage corresponding to the gray scale of the pixels of the 2nd, 3rd, 4th, . . . , and 640th columns according to the change of the sampling signal.

In the ith row selected subsequently, since the positive driving voltage is designated, for example, in the period of the H level of the sampling signal S1 during the period in which the scanning signal Gi is in the H level, the data signal Vid becomes the positive voltage corresponding to the gray scale of the "i×1" pixel, and thereafter, is changed to the positive voltage corresponding to the gray scale of the pixels of 2nd, 3rd, 4th, . . . , and 640th columns according to the change of the sampling signal. In addition, in the second field, since the scanning line of the (i+240)th row is selected after the ith row, the scanning signal Gi ascends to the H level and the polarity of the driving voltage is inversed, and thus the voltage waveform of the data signal Vid is changed as shown in FIG. 8.

In addition, in FIGS. 7 and 8, the vertical axis representing the voltage of the data signal Vid is scaled up to be further emphasized than that representing other signals for convenience. In addition, the data signal becomes the voltage corresponding to the black color over the period from the sampling signal S640 changed to the L level to the sampling signal S1 changed to the H level. This is because even though an erroneous signal caused by the timing failure or the like is written to a pixel, it does not affect displaying.

Figure 9:
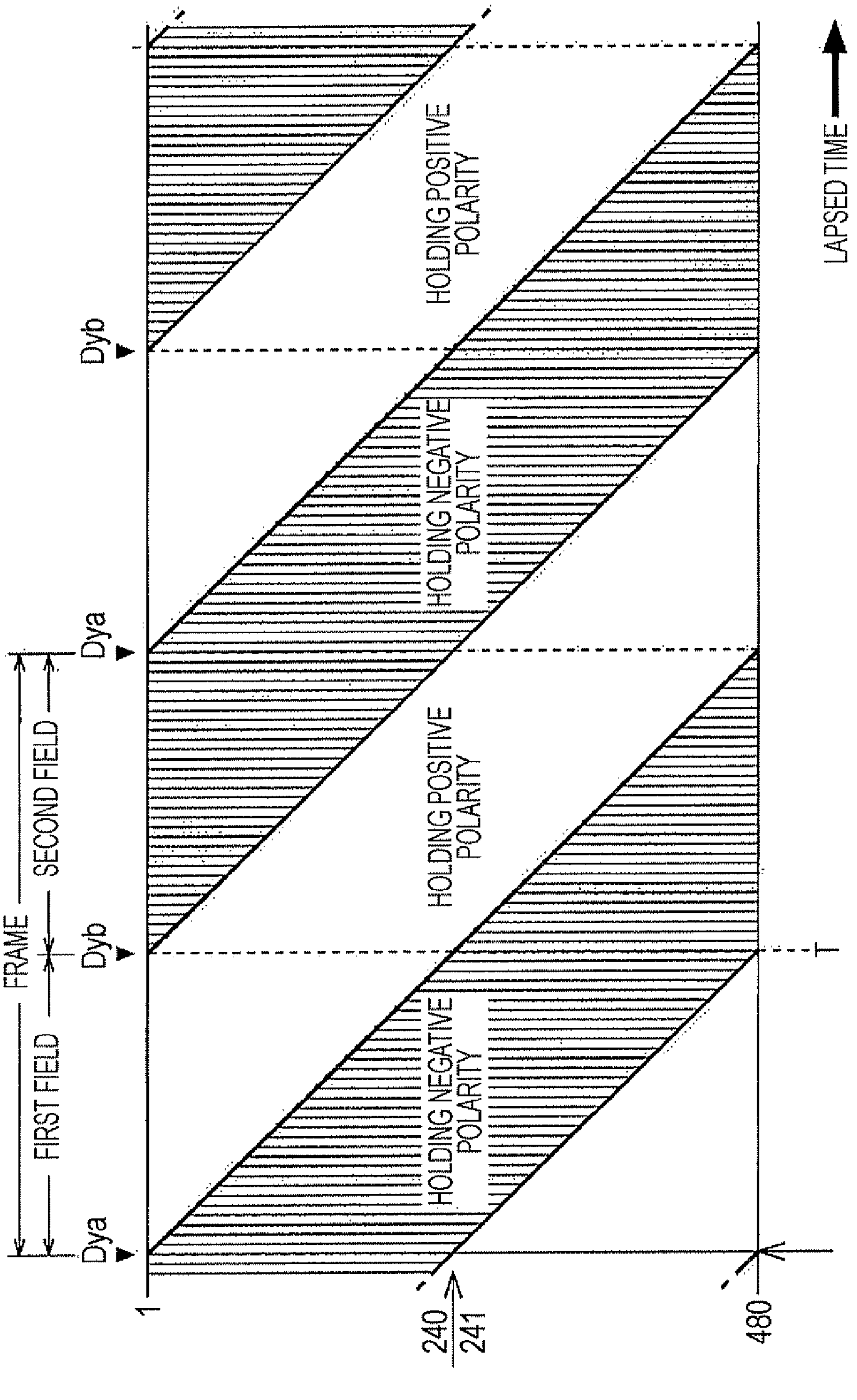
FIG. 9 is a view illustrating a writing state of rows when a designated value is "0", along with a lapse of time over successive frames.

FIG. 9 is a view illustrating a writing state of rows when a designated value Q is "0", along with a lapse of time over successive frames. In addition, the writing to the uppermost scanning line, that is, the start time of the positive sustain period is actually located at the timing lagged by the half cycle of the clock signal Cly after supplying the start pulse Dya, but for convenience of explanation, is illustrated to be simply matched with the start pulse Dya in FIG. 9. This will be the same in the drawings to be described below.

As shown in FIG. 9, in this embodiment, in the first field, the negative driving voltage is written to the pixels in the sequence of the 241st, 242nd, 243rd, . . . , and 480th rows, the positive driving voltage is written to the pixels in the sequence of the 1st, 2nd, 3rd, . . . , and 240th rows, and this writing state is held until the next writing.

On the other hand, in the second field, the negative driving voltage is written to the pixels in the sequence of the 1st, 2nd, 3rd, . . . , and 240th rows, the positive driving voltage is written to the pixels in the sequence of the 241st, 242nd, 243rd, . . . , and 480th rows, and similarly this writing state is held until the next writing.

That is, it can be seen that both the scanning line (A) to write the positive driving voltage and the scanning line (B) to write the negative driving voltage are selected in each field.

In this way, when the designated value Q is "0", the periods of the first and second fields correspond to the 240 cycles of the clock signal Cly. Therefore, the period in which the positive voltage is held on the liquid crystal capacitor 120 and the period in which the negative voltage is held on the liquid crystal capacitor 120 in the pixel have the length corresponding to almost the half of one frame.

Next, the case where the designated value Q is "−1" will be described now.

As shown in FIG. 5, when the designated value Q is "−1", the start pulse Dyb is output at the timing earlier than the timing T by one cycle of the clock signal Cly. For this reason, when the designated value Q is "−1", the period of the first field becomes a period corresponding to 239 cycles of the clock signal Cly, and the period of the second field becomes a period corresponding to 241 cycles of the clock signal Cly.

In addition, when the designated value Q is "−1", in the first field, the scanning lines are selected in the sequence of 242nd, 1st, 243rd, 2nd, 244th, 3rd, . . . , 480th, and 239th rows, and in the second field, the scanning lines are selected in the sequence of 1st, 240th, 2nd, 241st, 3rd, 242nd, . . . , 241st, and 480th rows.

Figure 10:
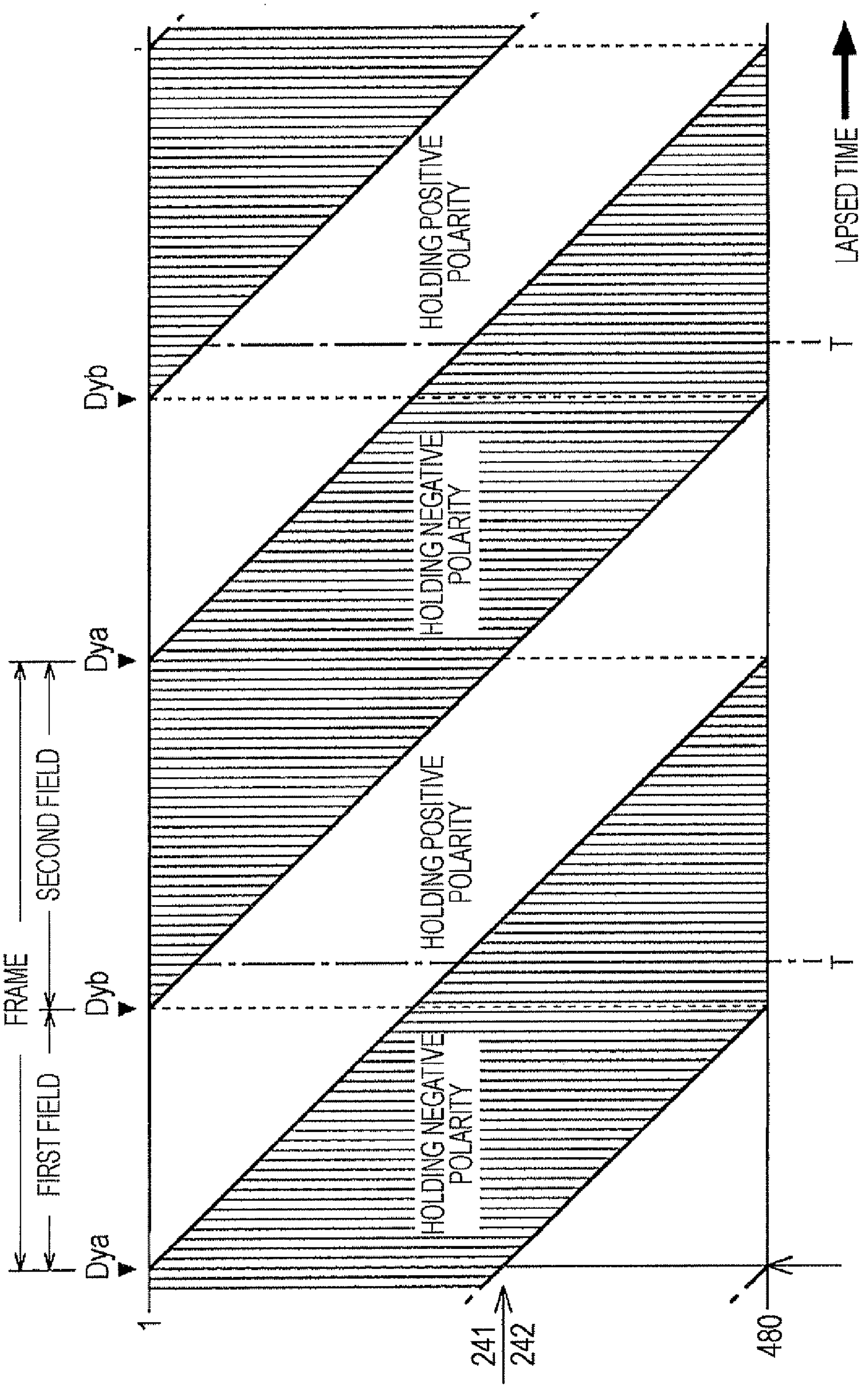
FIG. 10 is a view illustrating a writing state of rows when a designated value is "−1", along with a lapse of time over successive frames.

FIG. 10 is a view illustrating a writing state of rows when a designated value Q is "−1", along with a lapse of time over successive frames.

As shown in FIG. 10, since the output timing of the start pulse Dyb is shifted forward when the designated value Q is "−1", the sustain period of the negative voltage to be written by the selection triggered by the supply of the start pulse Dyb is elongated more than the sustain period of the positive voltage to be written by the selection triggered by the supply of the start pulse Dya.

That is, when the designated value Q is a negative value, the sustain period of the negative voltage to be written by the selection triggered by the supply of the start pulse Dyb becomes longer than the sustain period of the positive voltage to be written by the selection triggered by the supply of the start pulse Dya as an absolute value of the designated value Q increases.

For this reason, the balance between the positive voltage and the negative voltage applied to the liquid crystal capacitor 120 is lost, and the absolute value of the effective negative voltage is greater than the absolute value of the effective positive voltage.

Next, the case where the designated value Q is "+1" will be described now.

As shown in FIG. 6, when the designated value Q is "+1" for example, the start pulse Dyb is output at the timing later than the timing T by one cycle of the clock signal Cly. For this reason, when the designated value Q is "+1", the period of the first field becomes a period corresponding to 241 cycles of the clock signal Cly, and the period of the second field becomes a period corresponding to 239 cycles of the clock signal Cly.

In addition, when the designated value Q is "+1", in the first field, the scanning lines are selected in the sequence of 240th, 1st, 241st, 2nd, 242nd, 3rd, . . . , and 480th rows, and in the second field, the scanning lines are selected in the sequence of 1st, 242nd, 2nd, 243rd, 3rd, 244th, . . . , 239th, and 480th rows.

Figure 11:
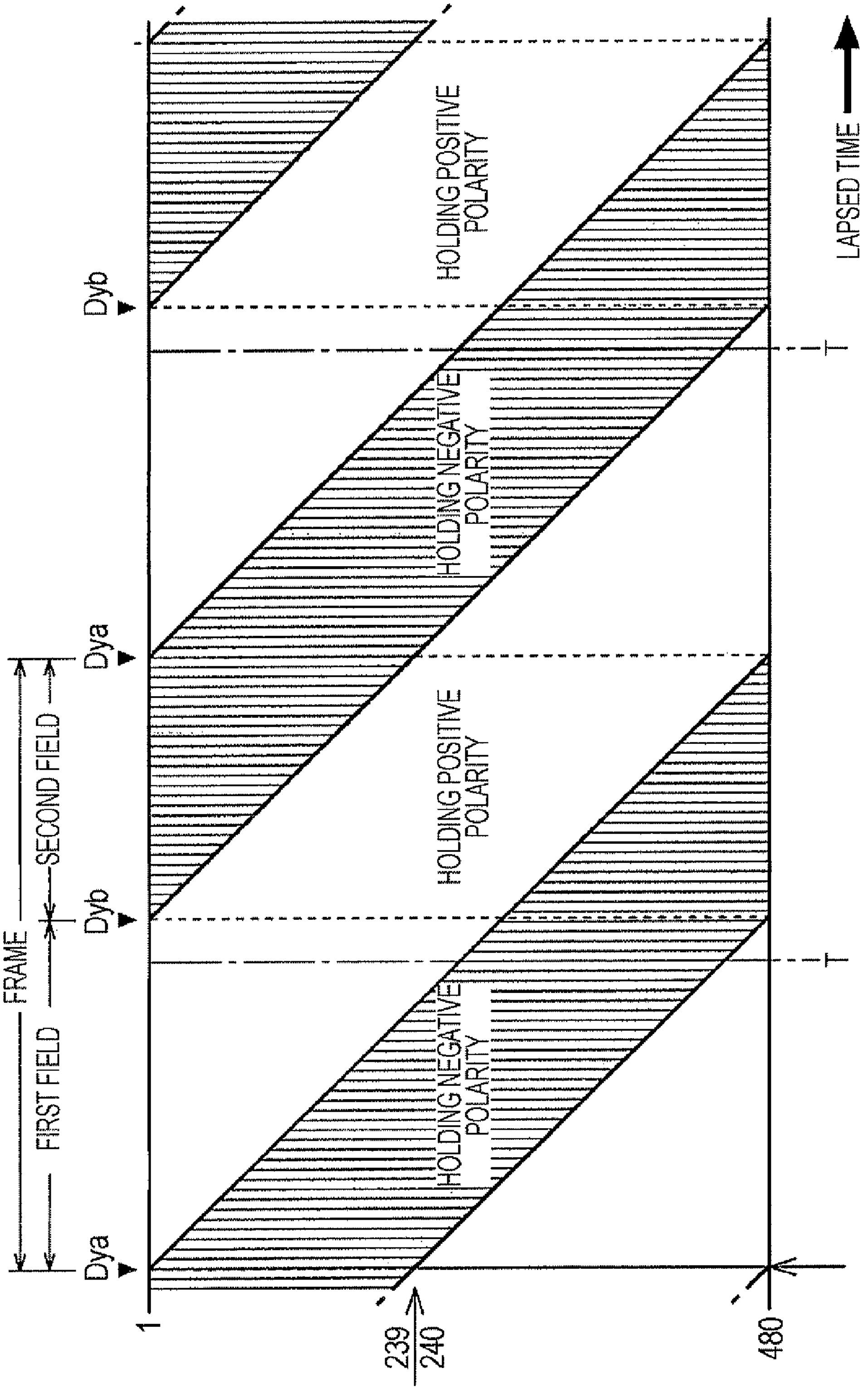
FIG. 11 is a view illustrating a writing state of rows when a designated value is "+1", along with a lapse of time over successive frames.

FIG. 11 is a view illustrating a writing state of rows when a designated value Q is "+1", along with a lapse of time over successive frames.

As shown in FIG. 11, since the output timing of the start pulse Dyb is shifted backward when the designated value Q is "+1", the sustain period of the negative voltage to be written by the selection triggered by the supply of the start pulse Dyb is shorter than the sustain period of the positive voltage to be written by the selection triggered by the supply of the start pulse Dya.

That is, when the designated value Q is a positive value, the sustain period of the negative voltage to be written by the selection triggered by the supply of the start pulse Dyb becomes shorter than the sustain period of the positive voltage to be written by the selection triggered by the supply of the start pulse Dya as an absolute value of the designated value Q increases.

For this reason, the absolute value of the effective negative voltage applied to the liquid crystal capacitor 120 is less than the absolute value of the effective positive voltage.

Figure 12:
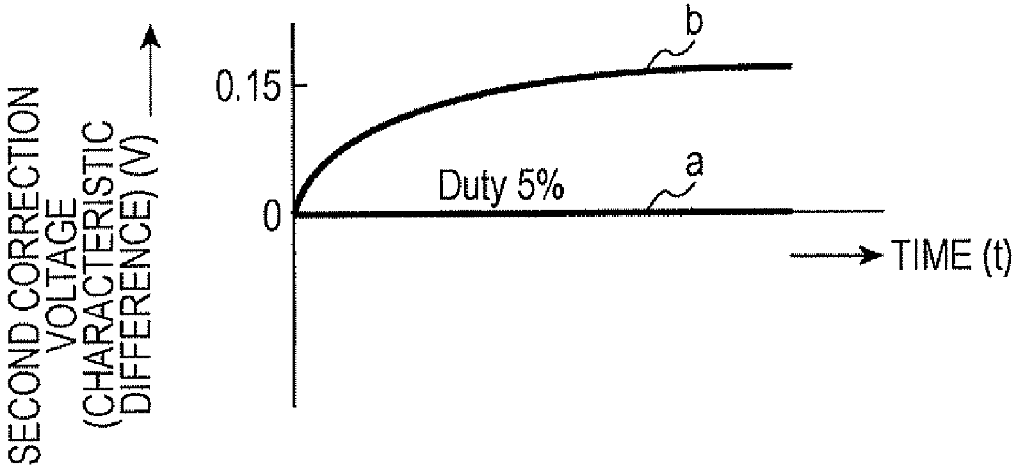
FIG. 12 is a graph illustrating experimental data of a driving method according to the first embodiment.

FIG. 12 is a graph illustrating experimental data of a driving method according to this embodiment.

In FIG. 12, the horizontal axis represents a lapsed time (t), and the vertical axis represents the correction voltage (V) for the second phenomenon (characteristic difference).

In addition, the graph "a" shows time dependency of the correction voltage for the second phenomenon in a product using the driving method according to this embodiment, and the graph "b" shows time dependency of the correction voltage for the second phenomenon in a product using the known driving method for comparison. In both the products, the counter electrode potential Com is set to a shifted value by the correction voltage for the first phenomenon.

In addition, the correction for the second phenomenon by the designated value Q on the basis of measured data is done in the product which corresponds to the graph "a". Specifically, the designated value Q is set to a plus value, an application time of the positive voltage is set to 55% of one frame, and an application time of the negative voltage is set to 45% of one frame.

As shown in the graph "b", in the product for comparison, the correction voltage of the second phenomenon is zero at the start time of displaying, but thereafter, the correction voltage of the second phenomenon increases as time elapses. That is, as time elapses, the direct-current voltage component is applied to the liquid crystal layer.

On the contrary, in the product using the driving method according to this embodiment, as shown in the graph "a", the correction voltage of the second phenomenon remains substantially at zero even though time elapses from the start time of displaying.

That is, it can be understood that the application of the direct-current voltage component to the liquid crystal layer caused by the first and second phenomenon is suppressed regardless of the lapse of time by shifting the counter electrode potential Com in advance by the correction voltage of the first phenomenon and by shifting the designated value Q in a minus direction for the second phenomenon.

As described above, according to the electro-optical device 1 according to this embodiment, the following effects can be obtained.

According to the driving method described above, since the counter electrode potential Com is set to the value which is shifted in advance by the correction voltage for the first phenomenon, the correction for the first phenomenon is achieved.

Further, the ratio of the effective value of the positive voltage to the effective value of the negative voltage applied to the liquid crystal capacitor 120 can be adjusted by moving the output timing of the start pulse Dyb forward or backward according to the designated value Q. In other words, the ratio of the effective value of the negative voltage to the effective value of the positive voltage applied during one frame can be adjusted by varying the ratio of a period length of the first field to a period length of the second field in a period length of one frame.

Therefore, comparing with the known driving method which utilizes the correction voltage obtained by adding the correction voltage for the first phenomenon and the correction voltage for the second phenomenon, it is possible to provide the method of driving the electro-optical device, in which the disadvantages of display, such as the flicker and the burn-in of the display image, can be suppressed.

In addition, since the shift amount of the counter electrode potential which is set in advance corresponds only to the correction voltage for the first phenomenon, the shift amount of the counter electrode potential decreases compared with the known driving method which utilizes the correction voltage obtained by adding the correction voltage for the first phenomenon and the correction voltage for the second phenomenon, and thus it is possible to suppress the direct-current voltage component from applying to the liquid crystal layer.

Therefore, comparing with the known driving method, it is possible to suppress the disadvantages of display, such as the flicker and the burn-in of the display image.

In addition, since the double-speed area scanning inversion driving scheme is employed as the driving method, no disclination occurs and the flicker, the cross-talk, or the like can be decreased compared with the known driving method such as the line inversion driving method.

These driving methods are performed such that the display data processing circuit 56 or the processing circuit 50 provided with the control circuit 52 controls the units installed or the voltage generating circuit 60 according to the designated value Q from the operator 70. The display panel 10 provided with the scanning line driving circuit 130 or the data line driving circuit 140 is driven and displayed according to the driving signal generated by the processing circuit 50 and the voltage generating circuit 60.

Here, the electro-optical device 1 includes the display panel 10, the processing circuit 50, the voltage generating circuit 60, and the operator 70.

Accordingly, comparing with the known electro-optical device, it is possible to provide the electro-optical device which can suppress the disadvantages of display, such as the flicker and the burn-in of the display image.

In addition, in the known electro-optical device, the correction voltage set at the initial stage is used without any change regardless of the lapse of time. In other words, it is difficult to change the correction voltage which is set in advance during the operation of the electro-optical device.

On the contrary, according to the electro-optical device 1 according to this embodiment, for example, even after the electro-optical device 1 is installed in an electronic apparatus, the designated value Q set by the operator 70 can be changed by the use of the operation unit such as the operation panel of the electronic apparatus or the remote controller.

Accordingly, even when the disadvantages of display, such as the flicker or the like, occur with the lapse of time, it is possible to adjust the correction voltage to suppress the disadvantages.

Second Embodiment

Figure 13:
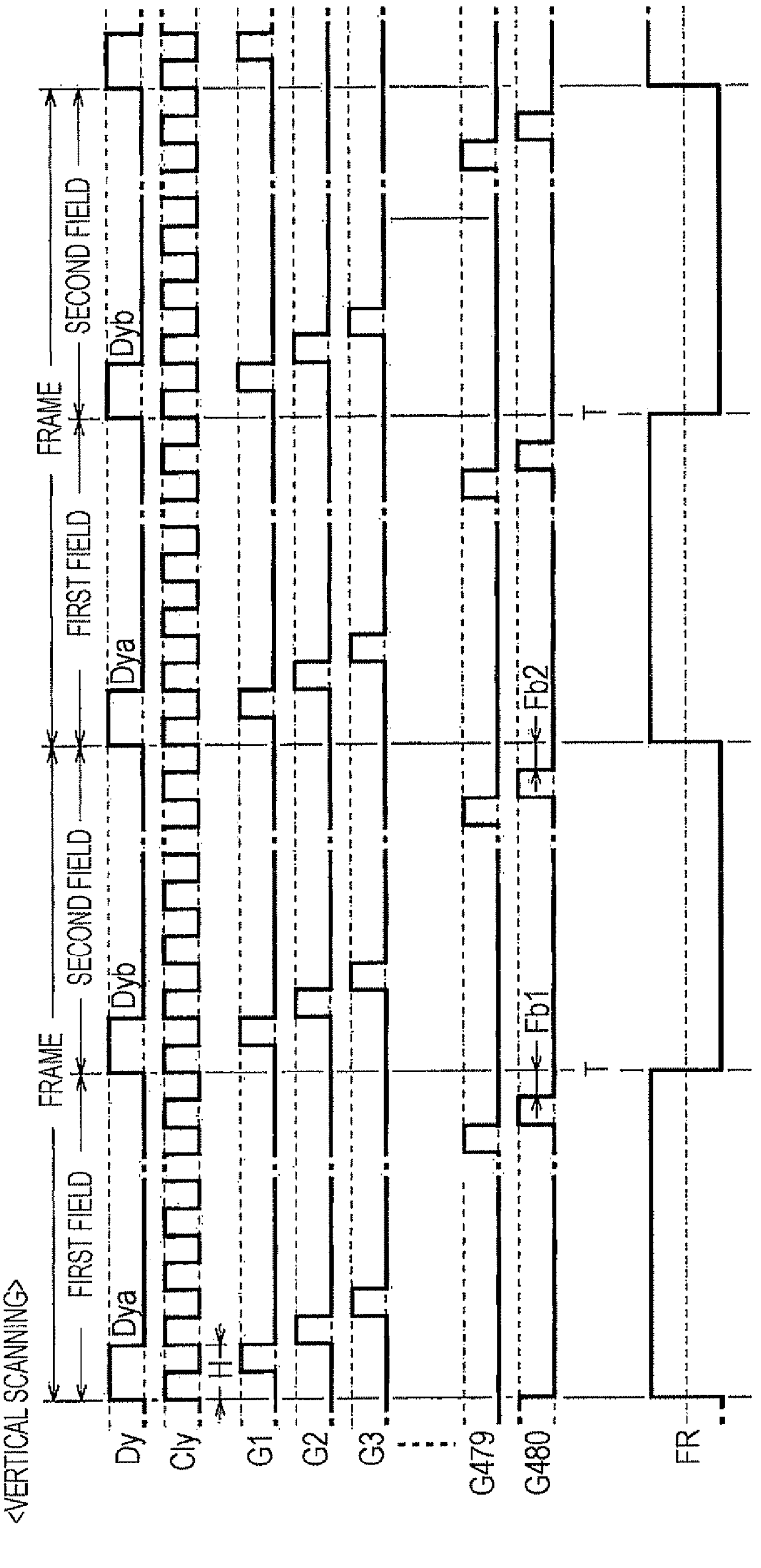
FIG. 13 is a view illustrating a timing chart of a scanning signal sequence in a driving method according to a second embodiment.
Figure 14:
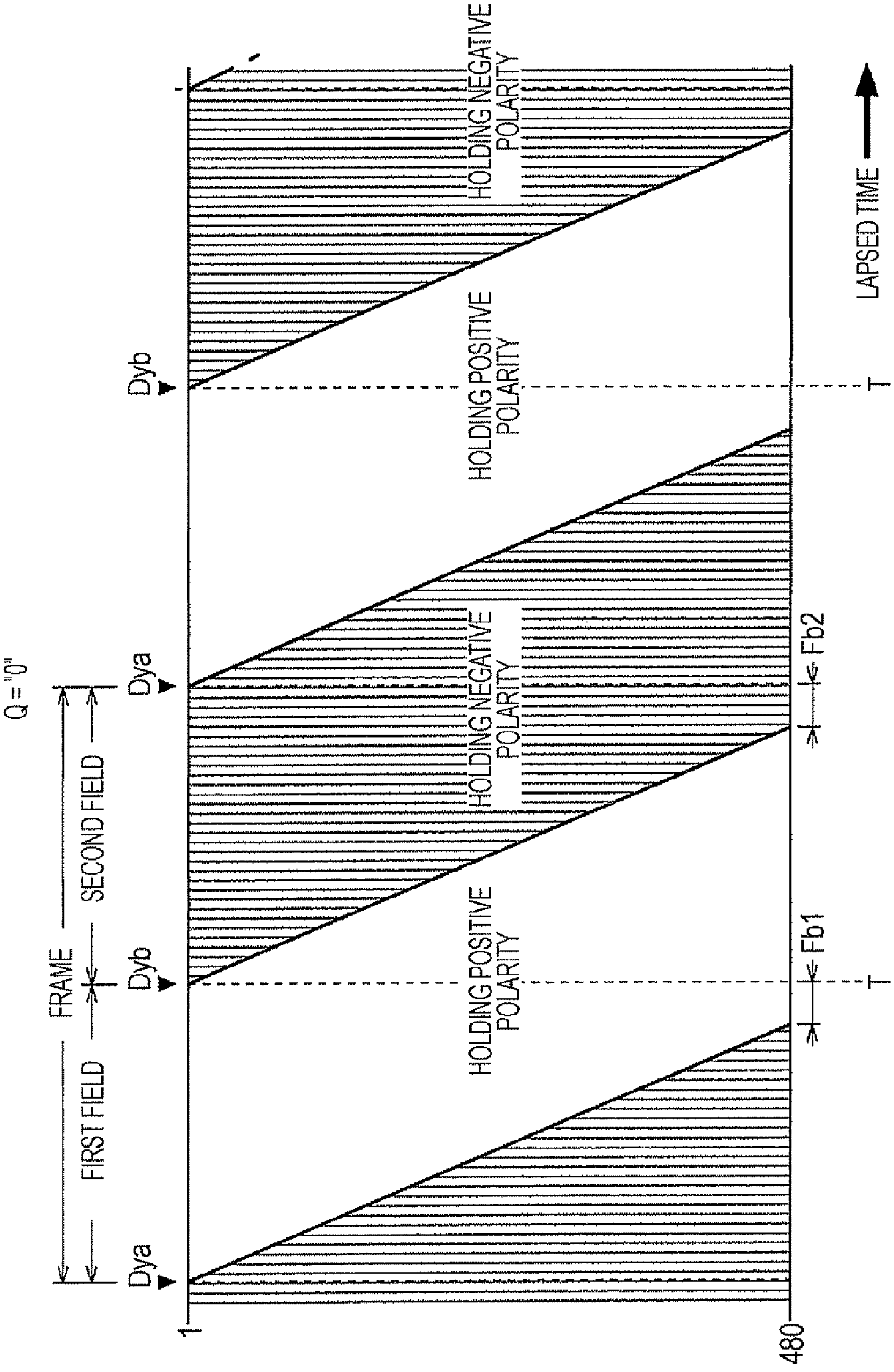
FIG. 14 is a view illustrating a writing state of rows when a designated value is "0", along with a lapse of time over successive frames.

FIG. 13 is a timing chart illustrating a scanning signal sequence of a driving method according to a second embodiment of the invention. FIG. 14 is a view illustrating a writing state of rows in successive frames with the lapse of time.

Here, the description already given in the first embodiment will be omitted, and the same components will be described with the same numerals.

The electro-optical device according to the second embodiment has the same configuration as that of the electro-optical device according to the first embodiment described with reference to FIGS. 1 to 3, and only the driving method thereof is different from that of the first embodiment.

Specifically, the second embodiment employs a so-called a surface inversion double-speed driving scheme, in which the scanning lines are selected in the sequence of 1st, 2nd, 3rd, 4th, . . . , 479th, and 480th rows in each of the first and second fields, and the polarity of the data signal in each field is inversed.

First, a method of driving the scanning lines will be described now.

FIG. 13 is a timing chart of the scanning signal sequence when the designated value Q is "0". Similarly to the first embodiment, one frame is configured to include the first and second fields. Further, also in the driving method according to this embodiment, the display data Video supplied from the external device is stored in the frame memory 57 similarly to the first embodiment, and thereafter, when a scanning line of a pixel row is selected, the display data of the corresponding pixel row is read at a speed 2 times the storage speed.

Then, in the first and second fields, the display data read out is written at a speed 2 times the storage speed in the sequence of the 1st to 480th rows of the scanning lines.

In addition, the scanning signal G1 supplied to the uppermost scanning line is output at the timing lagged by the half cycle of the clock signal Cly after the start pulse Dya is supplied.

Subsequently to the scanning signal G1, the scanning signals G2 to G480 sequentially switches to the H level in the period of half cycle of the clock signal every time a logic level of the clock signal Cly is changed.

Therefore, as shown in FIG. 13, in the first field, the scanning lines of the 1st to 480th rows are selected by being triggered by the supply of the start pulse Dya, and in the second field, the scanning lines of the 1st to 480th rows are selected by being triggered by the supply of the start pulse Dyb. In addition, the rising edge of the start pulse Dyb is matched with the timing T.

Here, similarly to the first embodiment, the counter electrode potential Com is shifted from the reference voltage Vc by the correction voltage for the first phenomenon (field-through).

In addition, the inversion in polarity of the data signal is defined by an alternating signal FR. The signal level of the alternating signal FR is changed in synchronization with the start pulse Dya and the start pulse Dyb. In other words, the alternating signal has a rectangular waveform which has a period of the first field of the H level and the second field of the L level.

The polarity of the data signal is inversed according to the H or L level of the alternating signal FR. Specifically, the polarity of the alternating signal is changed to the positive voltage in the first field, and to the negative voltage in the second field, so that the surface inversion driving is performed in one frame.

In addition, a flyback time Fb1 is provided from the selection of the scanning line of the 430th row in the first field to the selection of the scanning line of the 1st row in the second field of the next frame. Similarly, a flyback time Fb2 is provided from the selection of the scanning line of the 480th row in the second field to the selection of the scanning line of the 1st row in the first field of the next frame.

FIG. 14 is a view illustrating a writing state of rows when a designated value Q is "0", along with a lapse of time over successive frames.

As shown in FIG. 14, in the first field, the positive driving voltage is written to the pixels in the sequence of the 1st to 480th rows, and this writing state is held until the next writing is performed.

On the other hand, in the second field, the negative driving voltage is written to the pixels in the sequence of the 1st to 480th rows, and similarly this writing state is held until the next writing is performed.

In this way, when the designated value Q is "0", the periods of the first and second fields corresponds to the 240 cycles of the clock signal Cly. Therefore, each period of the positive voltage and the negative voltage held on the liquid crystal capacitor 120 in each pixel has the length corresponding to almost the half of one frame.

Figure 15:
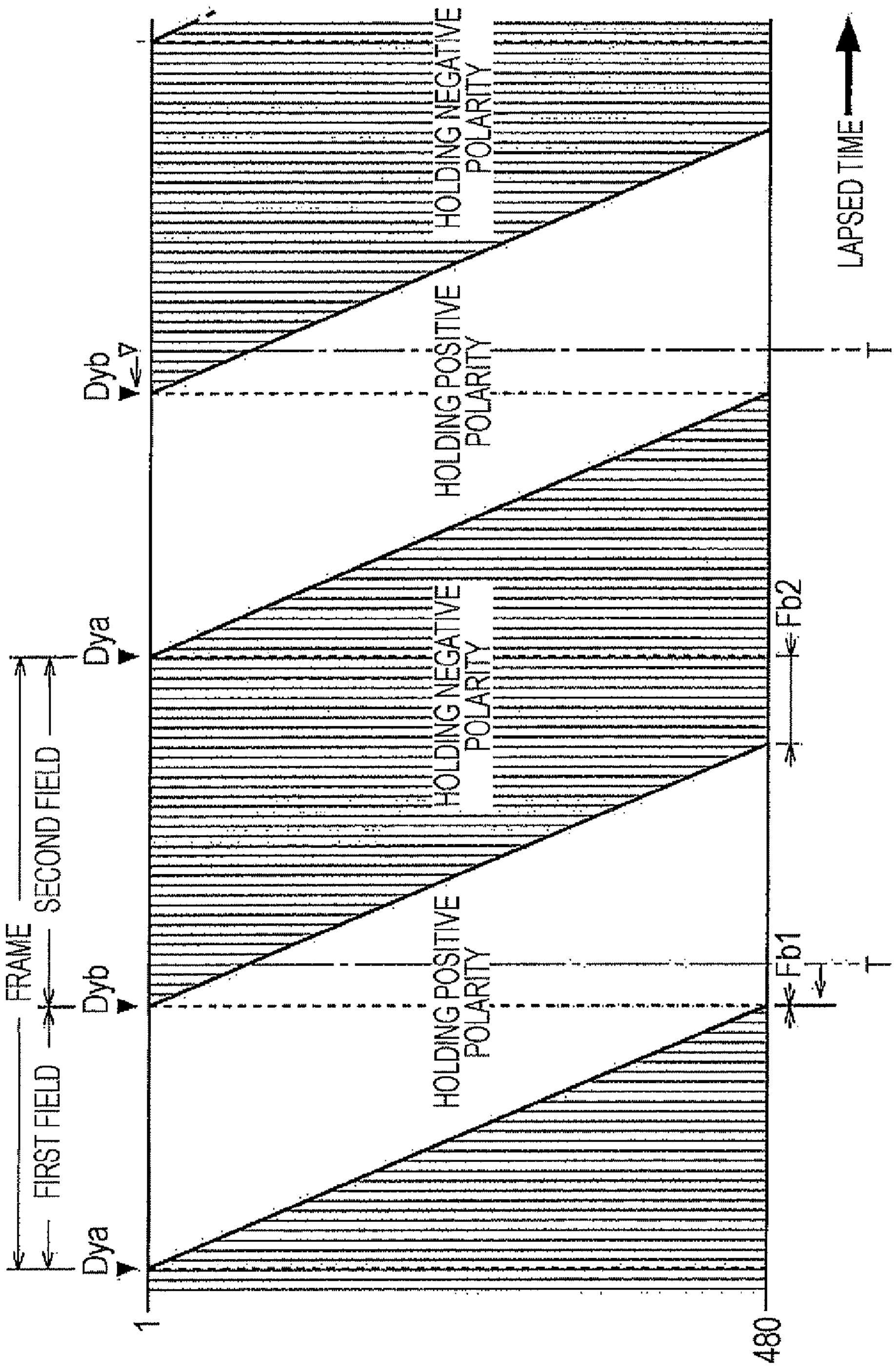
FIG. 15 is a view illustrating a writing state of rows when a designated value is a minus value, along with a lapse of time over successive frames.

FIG. 15 is a view illustrating a writing state of rows when a designated value Q is a minus value, along with a lapse of time over successive frames.

Next, the case where the designated value Q is a minus value will be described now.

As shown in FIG. 15, since the output timing of the start pulse Dyb is shifted forward than the timing T when the designated value Q is a minus value, the sustain period of the negative voltage written by the selection triggered by the supply of the start pulse Dyb becomes longer than the sustain period of the positive voltage written by the selection triggered by the supply of the start pulse Dya.

That is, when the designated value Q is a negative value, the sustain period of the negative voltage written by the selection triggered by the supply of the start pulse Dyb becomes longer than the sustain period of the positive voltage written by the selection triggered by the supply of the start pulse Dya as an absolute value of the designated value Q increases. For this reason, the balance between the positive voltage and the negative voltage applied to the liquid crystal capacitor 120 is lost, and the absolute value of the effective negative voltage is greater than the absolute value of the effective positive voltage.

In addition, when the start pulse Dyb is shifted forward than the timing T, the limitation of the shift is the time until the flyback time Fb1 becomes zero, as shown in FIG. 15.

Figure 16:
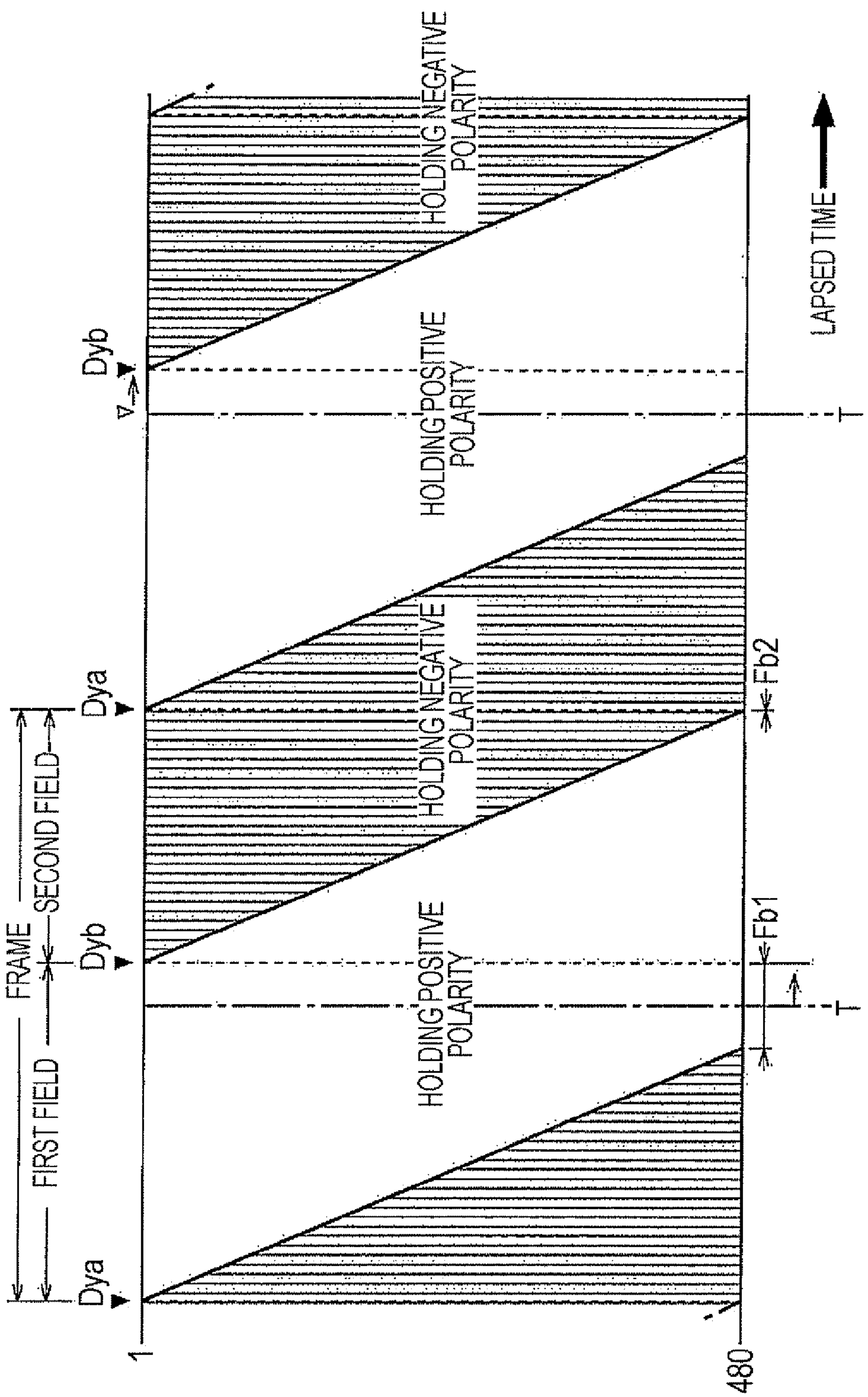
FIG. 16 is a view illustrating a writing state of rows when a designated value is a plus value, along with a lapse of time over successive frames.

FIG. 16 is a view illustrating a writing state of rows when a designated value Q is a plus value, along with a lapse of time over successive frames.

Next, the case where the designated value Q is a plus value will be described now.

As shown in FIG. 16, when the designated value Q is a plus value, since the output timing of the start pulse Dyb is later than the timing T, the sustain period of the negative voltage written by the selection triggered by the supply of the start pulse Dyb is shortened more than the sustain period of the positive voltage written by the selection triggered by the supply of the start pulse Dya.

That is, when the designated value Q is a positive value, the sustain period of the negative voltage written by the selection triggered by the supply of the start pulse Dyb becomes shorter than the sustain period of the positive voltage written by the selection triggered by the supply of the start pulse Dya as an absolute value of the designated value Q increases.

For this reason, the absolute value of the effective positive voltage is greater than the absolute value of the effective negative voltage. In addition, when the start pulse Dyb is shifted backward from the timing T, the limitation of the shift is the time until the flyback time Fb2 becomes zero, as shown in FIG. 16.

As described above, according to this embodiment, in addition to the effects of the first embodiment, the following effects can be obtained.

Since the surface inversion double-speed driving is employed as the driving method according to this embodiment, the disclination can be suppressed compared with the known driving method such as the line inversion driving method.

In addition, even when the surface inversion double-speed driving is performed, the driving method is applicable in which the counter electrode potential Com is set to be shifted in advance by the correction voltage for the first phenomenon and the ratio of the period length of the first field to the period length of the second field in one frame is variable.

Therefore, comparing with the known driving method, it is possible to suppress the disadvantages of display, such as the flicker and the burn-in of the display image.

Third Embodiment

Figure 17:
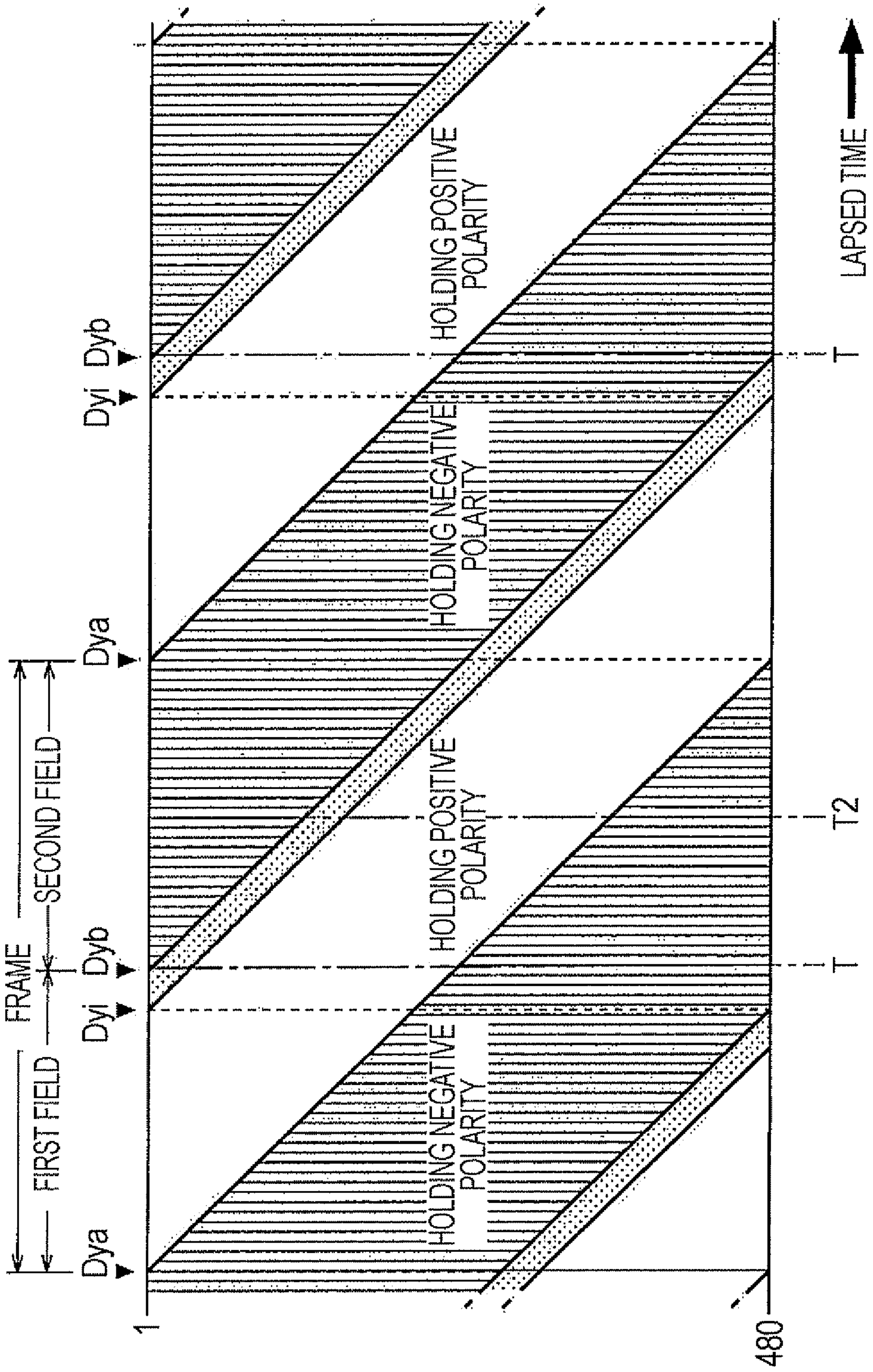
FIG. 17 is a view illustrating a writing state of rows when a designated value Q in a driving method according to a third embodiment is "−1", along with a lapse of time over successive frames.
Figure 18:
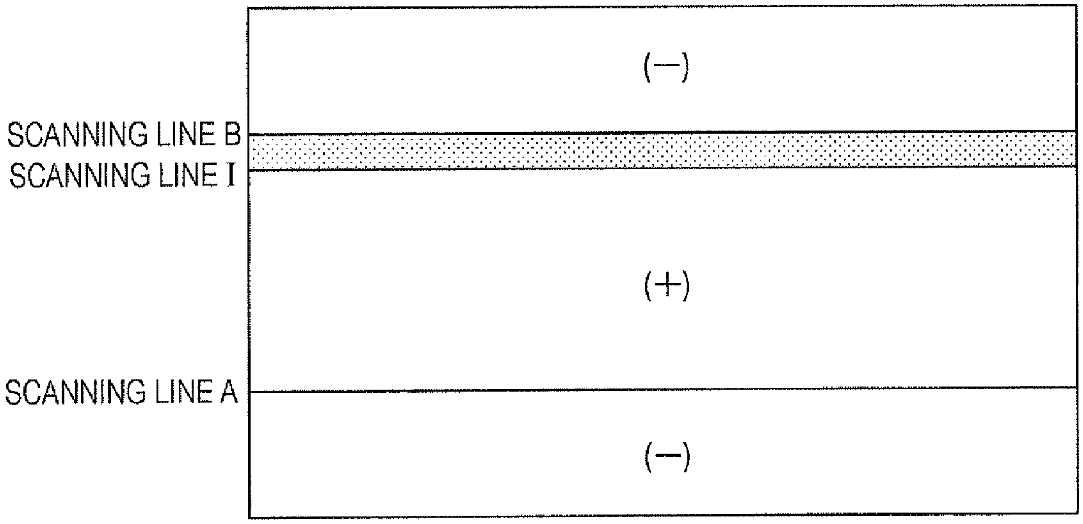
FIG. 18 is a view illustrating a screen at a timing T2.

FIG. 17 is a view illustrating a writing state of rows in a driving method according to a third embodiment, along with a lapse of time over successive frames. FIG. 18 is a view illustrating a screen of an electro-optical device at the timing T2.

Here, the description already given in the first embodiment will be omitted, and the same components will be described with the same numerals.

The electro-optical device according to the third embodiment has the same configuration as that of the electro-optical device according to the first embodiment described with reference to FIGS. 1 to 3, and only the driving method thereof is different from that of the first embodiment.

Specifically, in the third embodiment, the so-called double-speed area scanning inversion driving is performed similarly to the first embodiment. However, according to the designated value Q, a third scanning line is selected to write predetermined gray scale in the first field and the second field.

In addition, similarly to the first embodiment, the counter electrode potential Com is shifted from the reference voltage Vc by the correction voltage for the first phenomenon (field-through).

Further, a liquid crystal mode is set to a normally black mode. In this mode, when an effective voltage value held in the liquid crystal capacitor 120 is approximately zero, a transmittance of light passing through the liquid crystal capacitor is minimized to display a black color. On the other hand, as the effective voltage value increases, an amount of transmitted light increases, and finally a white color having the maximum transmittance is displayed.

First, a driving scheme in this embodiment is the same as described with reference to FIGS. 4 and 9 including the timing chart when the designated value Q is "0".

That is, as shown in FIG. 9, when the designated value Q is "0", the periods of the first and second fields correspond to 240 cycles of the clock signal Cly. Therefore, each period of the positive voltage and the negative voltage held on the liquid crystal capacitor 120 in each pixel has the length corresponding to almost the half of one frame.

FIG. 17 is a view illustrating a writing state of rows when a designated value Q is "−1", along with a lapse of time over successive frames.

As shown in FIG. 17, when the designated value Q is "−1", the start pulse Dyi is supplied in order to select the third scanning line at timing earlier than the timing for supplying the start pulse Dyb by the period H of one cycle of the clock signal. In other words, the start pulse Dyi is supplied at timing earlier than the timing T by one cycle of the clock signal Cly.

Then, in the timing T, the start pulse Dyb is supplied.

FIG. 18 is a view illustrating a writing state at the timing T2 in the substantially middle of the second field.

In the following, it will be described by denoting a scanning line selected by the start pulse Dya as the scanning line A, a scanning line selected by the start pulse Dyi as the scanning line I, and a scanning line selected by the start pulse Dyb as the scanning line B.

The scanning lines A, I, and B move from top to bottom of the FIG. 18. That is, a pixel of a row is subjected to the writing of the positive driving voltage by the scanning line A, and then writing is performed by the scanning line I and the scanning line B.

Here, the writing by the scanning line I is performed earlier than the timing T by one cycle of the clock signal Cly, so that the positive sustain period by the scanning line A is shortened by the amount of one cycle of the clock signal. In addition, the voltage of the data signal Vid written by the scanning line I is the voltage corresponding to the predetermined gray scale set at the initial stage. The data signal Vid is preferably set to the identical potential to the counter electrode potential Com.

Figure 21A:
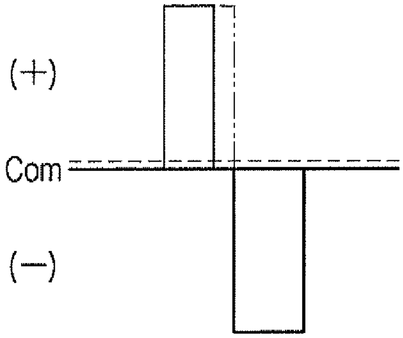
FIG. 21A is a view illustrating a waveform of a data signal when a designated value is a minus value.

FIG. 21A is a view illustrating a waveform of the data signal when the designated value Q is a minus value, and shows the waveform of the data signal applied to one pixel in one frame.

Specifically, in the first field, the positive data signal is applied by the scanning line A, and then the data signal having the identical potential to the counter electrode potential Com is applied by the scanning line I. In the second field, the negative data signal is applied by the scanning line B.

That is, the positive sustain period becomes shorter than the negative sustain period by the scanning period of the scanning line I shown with a dotted line.

For this reason, the balance between the positive voltage and the negative voltage applied to the liquid crystal capacitor 120 is lost, and the absolute value of the effective negative voltage is greater than the absolute value of the effective positive voltage.

In this embodiment, since the normally black mode is employed and the data signal written by the scanning line I has the identical potential to the counter electrode potential Com, the black color is written during the scanning period of the scanning line I.

Therefore, in particular, when a moving image is displayed, the black color is inserted by the scanning line I every one frame, and it is similar to an impulse type display. Accordingly, it is possible to increase the visibility of moving image.

Figure 19:
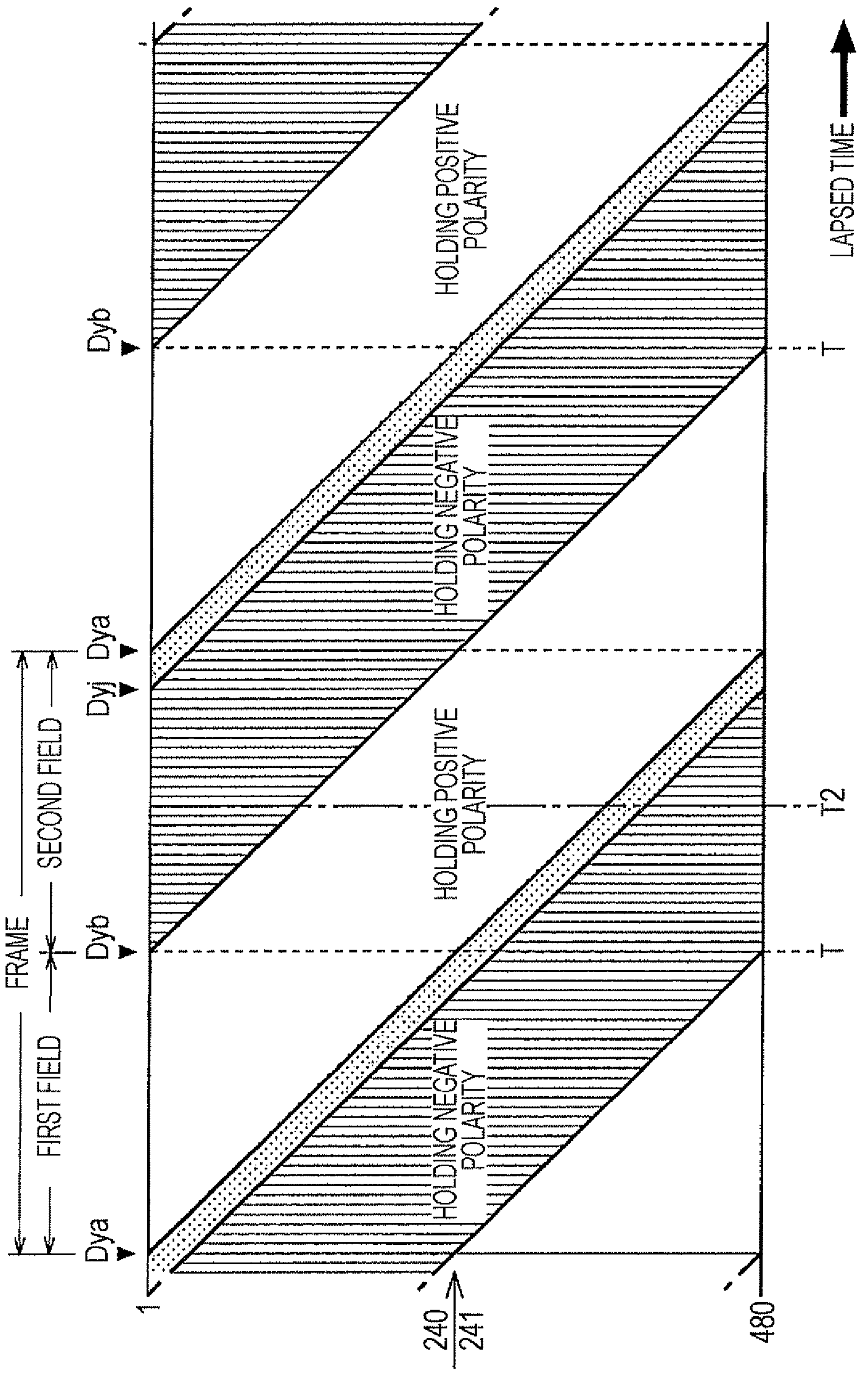
FIG. 19 is a view illustrating a writing state of rows when a designated value is "+1", along with a lapse of time over successive frames.

FIG. 19 is a view illustrating a writing state of rows when a designated value Q is "+1", along with a lapse of time over successive frames.

As shown in FIG. 19, when the designated value Q is "+1", the start pulse Dyj is supplied in order to select the third scanning line at timing earlier than the timing for supplying the start pulse Dya by the period H of one cycle of the clock signal. In other words, the start pulse Dyj is supplied at timing earlier than the start pulse Dya of the next frame by one cycle of the clock signal Cly.

Further, in the timing T, the start pulse Dyb is supplied.

Figure 20:
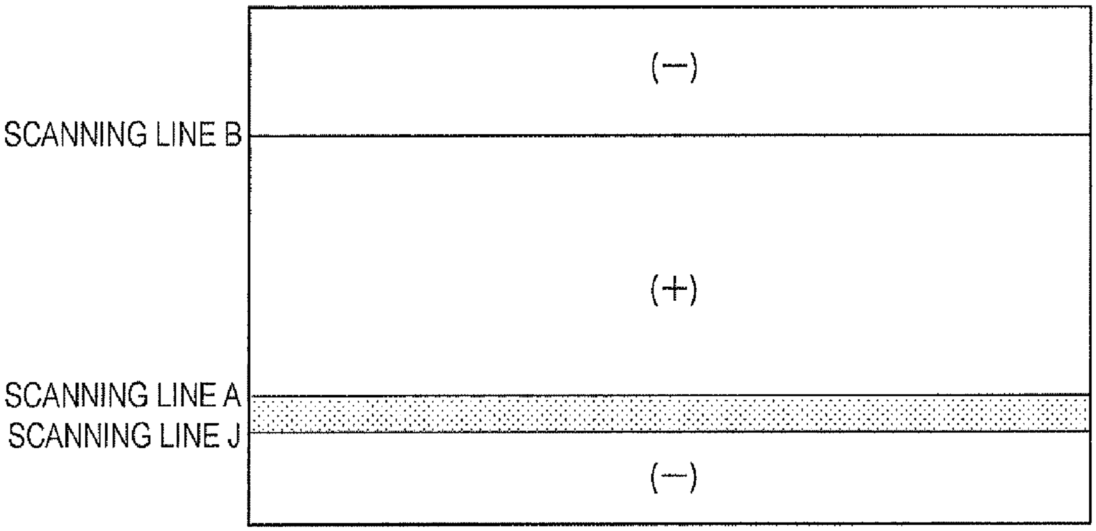
FIG. 20 is a view illustrating a screen at a timing T2.

FIG. 20 is a view illustrating a writing state at the timing T2 in the substantially middle of the second field.

In the following, it will be described by denoting a scanning line selected by the start pulse Dyj as the scanning line J. The scanning lines J, A, and B move from top to bottom of the FIG. 20. That is, a pixel of a row is subjected to writing of the positive driving voltage by the scanning line J, and then writing is performed by the scanning line A and the scanning line B.

Here, the writing by the scanning line J is performed earlier than the start pulse Dya of the next frame by one cycle of the clock signal Cly, so that the negative sustain period by the scanning line B is shortened by the amount of one cycle of the clock signal. In addition, the voltage of the data signal Vid written by the scanning line J is the voltage corresponding to the predetermined gray scale set at the initial stage. The data signal Vid is preferably set to the identical potential to the counter electrode potential Com.

Figure 21B:
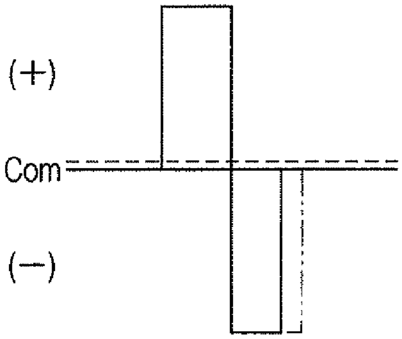
FIG. 21B is a view illustrating a waveform of a data signal when a designated value Q is a plus value.

FIG. 21B is a view illustrating a waveform of the data signal when the designated value Q is a plus value, and shows the waveform of the data signal applied to one pixel in one frame.

Specifically, in the first field, the positive data signal is applied by the scanning line A. In the second field, the negative data signal is applied by the scanning line B, and then the data signal having the identical potential to the counter electrode potential Com is applied by the scanning line J.

That is, the negative sustain period becomes shorter than the positive sustain period by the selected period of the scanning line J shown with a dotted line.

For this reason, the absolute value of the effective positive voltage is greater than the absolute value of the effective negative voltage.

Similarly to the case where the designated value Q is a minus value, it is possible to increase the visibility of moving image. In addition, the gray scale written by the scanning lines I and J is not limited to the black color, and for example, other gray scale such as a gray color may be employed.

Further, these driving method can be implemented such that the processing circuit 50 shown in FIG. 1 generates both the start pulse Dyi in order to select the scanning line I and the start pulse Dyj in order to select the scanning line J as the third scanning line according to the designated value Q of the operator 70, and supplies the counter electrode potential Com as the data signal Vid.

As described above, according to this embodiment, the following effects can be obtained.

With the driving method in which the third scanning line I or the third scanning line J is selected to write predetermined gray scale in the first field or the second field according to the designated value Q, similarly to the first embodiment, it is possible to suppress the disadvantages of display, such as the flicker and the burn-in of the display image compared with the known driving method.

In addition to the effects of the first embodiment, since the gray scale written by the scanning lines I and J is the black color, the black color is inserted into every one frame, and it is similar to an impulse type display. Accordingly, it is possible to increase the visibility in moving image.

Though the normally black mode has been exemplified in this embodiment, it is possible to obtain the effect that the disadvantages of display, such as the flicker and the burn-in of the display image, are suppressed also in the normally white mode. In the case of the normally white mode, if the data signal Vid is set to a value close to a voltage Vsat rather than the counter electrode potential Com in order to display the black color, it is possible to further increase the visibility in moving image. In particular, when Vid>Vsat is satisfied, while suppressing the disadvantages of display, such as the flicker and the burn-in of the display image, regardless of the display state, it is possible to obtain the effect that the visibility in moving image increases. In this case, when Vid>Vsat is satisfied, the designated value Q is adjusted in a direction which is opposite to the direction in the case of Vid=Vcom.

Fourth Embodiment

Figure 22:
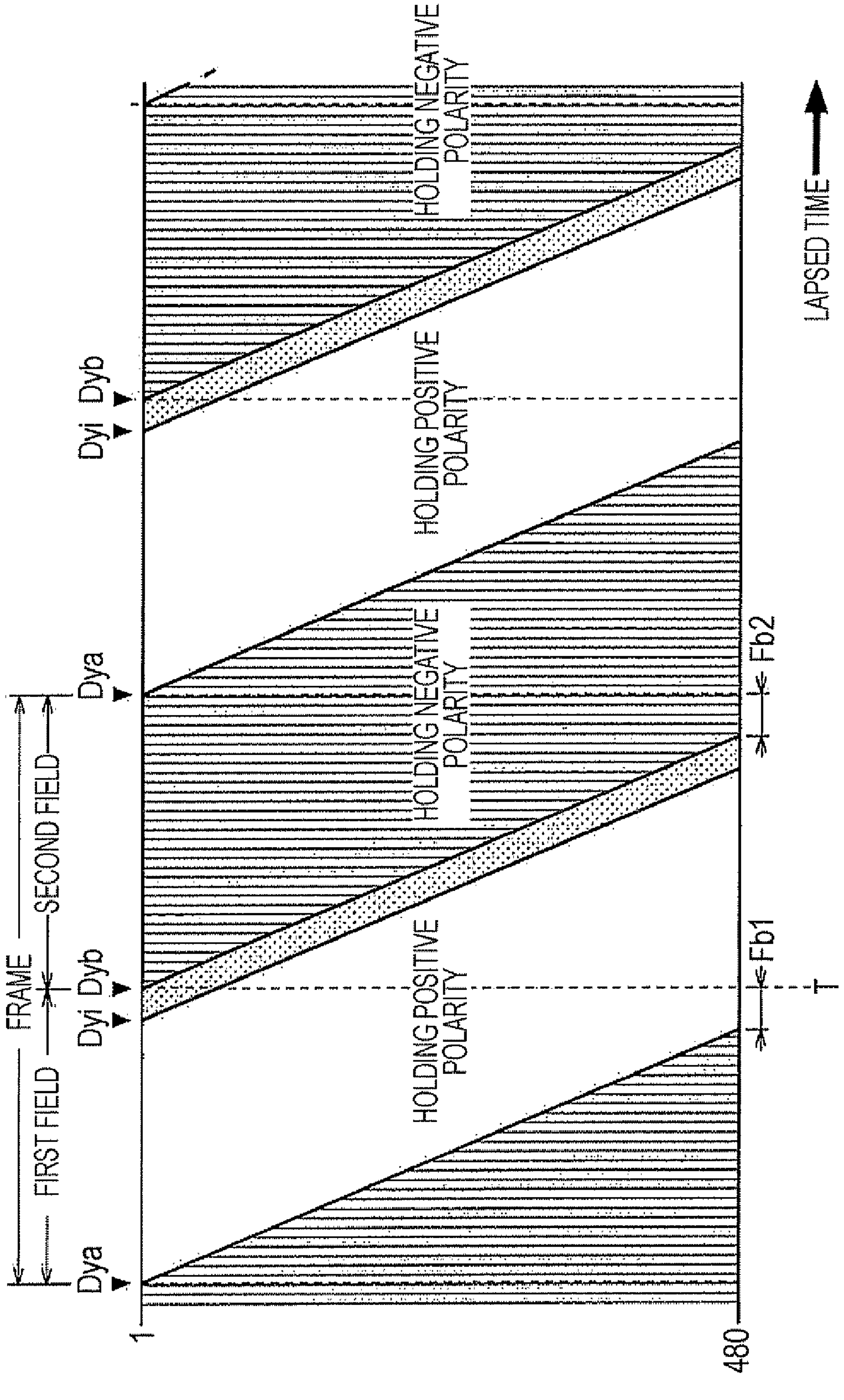
FIG. 22 is a view illustrating a writing state of rows when a designated value in a driving method according to a fourth embodiment is "−1", along with a lapse of time over successive frames.
Figure 23:
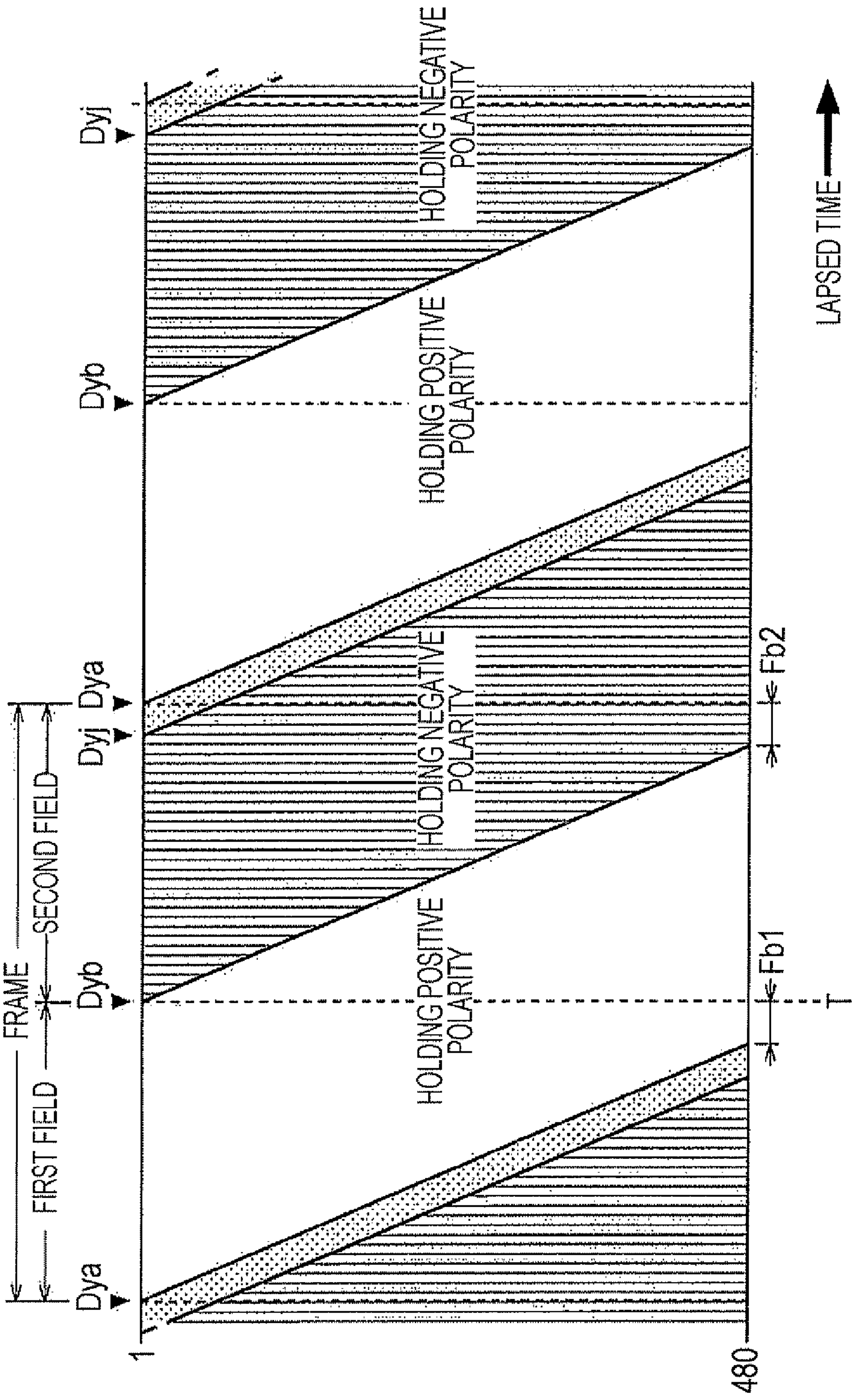
FIG. 23 is a view illustrating a writing state of rows when a designated value is "+1", along with a lapse of time over successive frames.

FIGS. 22 and 23 are views illustrating a writing state of rows in a driving method according to a fourth embodiment, along with a lapse of time over successive frames.

Here, the description already given in the first to third embodiments will be omitted, and the same components will be described with the same numerals.

The electro-optical device according to the fourth embodiment has the same configuration as that of the electro-optical device according to the first embodiment described with reference to FIGS. 1 to 3.

In the fourth embodiment, the surface inversion double-speed driving is performed similarly to the second embodiment. However, according to the designated value Q, the scanning lines are selected to write predetermined gray scale in the first field or the second field similar to the third embodiment.

Similarly to the first embodiment, the counter electrode potential Com is shifted from the reference voltage Vc by the correction voltage for the first phenomenon (field-through).

Further, a liquid crystal mode is set to the normally black mode.

First, a driving scheme in this embodiment is the same as described with reference to FIGS. 13 and 14 including the timing chart when the designated value Q is "0".

That is, as shown in FIG. 14, when the designated value Q is "0", the periods of the first and second fields correspond to 240 cycles of the clock signal Cly. Therefore, each period of the positive voltage and the negative voltage held on the liquid crystal capacitor 120 in each pixel has the length corresponding to almost the half of one frame.

FIG. 22 is a view illustrating a writing state of rows when a designated value Q is "−1", along with a lapse of time over successive frames.

As shown in FIG. 22, when the designated value Q is "−1", the start pulse Dyi is supplied in order to select the scanning line for writing the predetermined gray scale at timing earlier than the timing for supplying the start pulse Dyb by the period H of one cycle of the clock signal. In other words, the start pulse Dyi is supplied at timing earlier than the timing T by one cycle of the clock signal Cly.

Further, in the timing T, the start pulse Dyb is supplied.

The data signal Vid which is written by the scanning line I starting from the start pulse Dyi is set to the identical potential to the counter electrode potential Com.

That is, the positive sustain period by the scanning line A starting from the start pulse Dya is shorter than the negative sustain period by the scanning line B starting from the start pulse Dyb by the period written by the scanning line I (one cycle of the clock signal Cly).

Therefore, as shown in FIG. 21A, in the data signal Vid applied in one frame, the positive sustain period is shorter than the negative sustain period by the scanning period of the scanning line I shown with a dotted line.

For this reason, the balance between the positive voltage and the negative voltage applied to the liquid crystal capacitor 120 is lost, and the absolute value of the effective negative voltage is greater than the absolute value of the effective positive voltage.

FIG. 23 is a view illustrating a writing state of rows when a designated value Q is "+1", along with a lapse of time over successive frames.

As shown in FIG. 23, when the designated value Q is "+1", the start pulse Dyj is supplied in order to select the scanning line J for writing the predetermined gray scale at timing earlier than the timing for supplying the start pulse Dya by the period H of one cycle of the clock signal. In other words, the start pulse Dyj is supplied at timing earlier than the start pulse Dya of the next frame by one cycle of the clock signal Cly. Further, in the timing T, the start pulse Dyb is supplied. The data signal Vid which is written by the scanning line J starting from the start pulse Dyj is set to the identical potential to the counter electrode potential Com.

That is, the negative sustain period by the scanning line B starting from the start pulse Dyb is shorter than the positive sustain period by the scanning line A starting from the start pulse Dya by the period written by the scanning line J (one cycle of the clock signal Cly).

Therefore, as shown in FIG. 21B, in the data signal Vid applied in one frame, the negative sustain period is shorter than the positive sustain period by the scanning period of the scanning line J shown with a dotted line.

For this reason, the absolute value of the effective positive voltage is greater than the absolute value of the effective negative voltage. Since the data signal written by the scanning line J has the identical potential to the counter electrode potential Com, the black color is written in the normally black mode.

Therefore, in particular, when a moving image is displayed, the black color is inserted by the scanning line J every one frame, and it is similar to an impulse type display. Accordingly, it is possible to increase the visibility of moving image.

As described above, according to this embodiment, the following effects can be obtained.

In the case of performing the surface inversion double-speed driving, it is also possible to employ the driving method in which the third scanning line I or the third scanning line J is selected to write the predetermined gray scale in the first field or the second field according to the designated value Q.

Accordingly, it is also possible to suppress the disadvantages of display, such as the flicker and the burn-in of the display image, in the surface inversion double-speed driving.

Though the normally black mode has been exemplified in this embodiment, it is possible to obtain the effect that the disadvantages of display, such as the flicker and the burn-in of the display image, are suppressed also in the normally white mode. In the case of the normally white mode, if the data signal Vid is set to a value close to a voltage Vsat rather than the counter electrode potential Com in order to display the black color, it is possible to further increase the visibility in moving image. In particular, when Vid>Vsat is satisfied, while suppressing the disadvantages of display, such as the flicker and the burn-in of the display image, regardless of the display state, it is possible to obtain the effect that the visibility in moving image increases. In this case, when Vid>Vsat is satisfied, the designated value Q is adjusted in a direction which is opposite to the direction in the case of Vid=Vcom.

Fifth Embodiment

Figure 24:
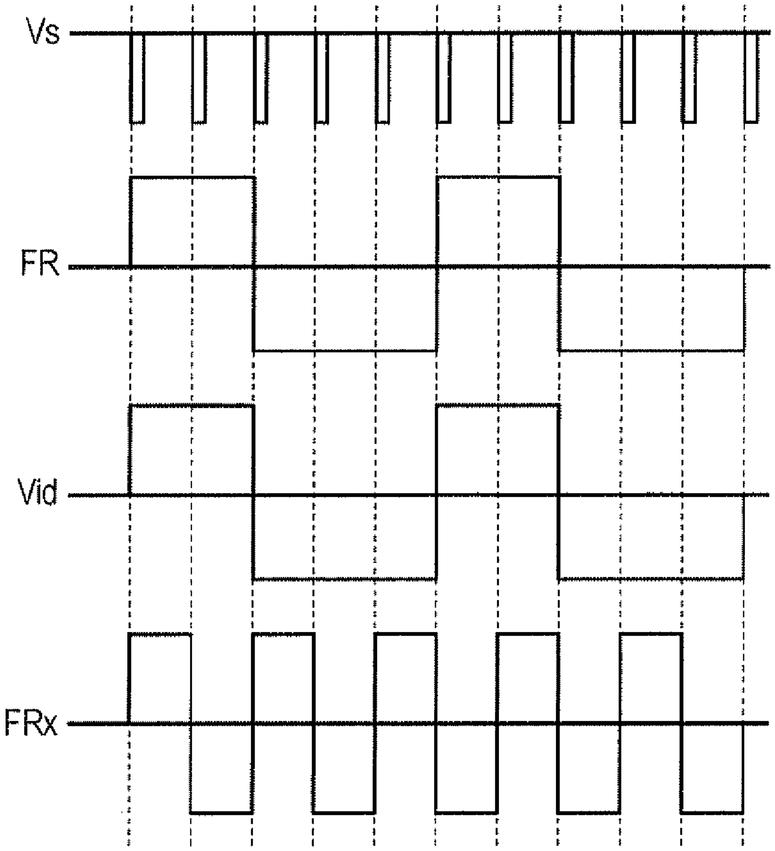
FIG. 24 is a view illustrating a timing chart in a driving method according to a fifth embodiment.

FIG. 24 is a view illustrating a timing chart in a driving method according to a fifth embodiment.

Here, the description already given in the first embodiment will be omitted, and the same components will be described with the same numerals.

The electro-optical device according to the fifth embodiment has a configuration in which the frame memory 57 is simplified in the processing circuit 50 shown in FIG. 1. Specifically, the frame memory 57 is configured to be reduced by the memory capacity used for the double-speed driving.

In the fifth embodiment, based on a frame inversion driving in which the polarity of the data signal Vid is inversed at every vertical synchronization signal Vs, a driving method capable of suppressing the direct-current voltage component is employed.

First, in order to explain the driving method in this embodiment, the outline of the frame inversion driving in the known technology will be described using FIG. 24.

In FIG. 24, the vertical synchronization signal Vs, the alternating signal FR in this embodiment, the data signal Vid, and an output timing of an alternating signal FRx in the known technology are shown. In the driving method in the known technology, the level of the alternating signal FRx is changed in synchronization with the output timing of the vertical synchronization signal Vs. In other words, the level is changed every one frame.

Therefore, also the data signal as an output signal having the same polarity as that of the alternating signal FRx has a rectangular waveform (not shown) which is changed in its polarity every one frame.

In addition, the counter electrode potential is set to a shifted value by the correction voltage obtained by adding the correction voltage for the first phenomenon (field-through) and the correction voltage for the second phenomenon (characteristic difference).

In contrast, in the driving method according to this embodiment, first, the counter electrode potential Com is shifted from the reference voltage Vc by the correction voltage for the first phenomenon (field-through) similar to the first embodiment.

For example, five successive frames are set as a unit, and the ratio of the number of frame applied with the positive driving voltage and the number of frame applied with the negative driving voltage in the unit is adjusted according to the designated value Q. In other words, in the period length of five frames, the ratio of the period length applied with the positive data signal to the period length applied with the negative data signal is adjusted.

For example, as shown in FIG. 24, when the designated value Q is a minus value, the alternating signal FR is generated such that the ratio of the positive polarity to the negative polarity becomes 2:3 in the sequence of two positive frames and three negative frames. Therefore, the data signal Vid is also generated in the sequence of two frames of the positive data signal Vid and the following three frames of the negative data signal Vid according to the level of the alternating signal FR.

As a result, the balance between the positive voltage and the negative voltage applied to the liquid crystal capacitor 120 is lost, and the absolute value of the effective negative voltage is greater than the absolute value of the effective positive voltage.

The level arrangement of the alternating signal FR is not limited to the above-mentioned sequence as long as the ratio of the positive polarity to the negative polarity can be set to 2:3. For example, the arrangement may be in the sequence of one frame of the negative polarity, one frame of the positive polarity, one frame of the negative polarity, one frame of the positive polarity, and one frame of the negative polarity.

In addition, when the designated value Q is a plus value, for example, the alternating signal FR is generated by the processing circuit 50 such that the ratio of the positive polarity to the negative polarity becomes 3:2 in the sequence of three positive frames and two negative frames.

Therefore, the data signal Vid is also generated in the sequence of three frames of the positive data signal Vid and the following two frames of the negative data signal Vid according to the level of the alternating signal FR.

As a result, the absolute value of the effective positive voltage is greater than the absolute value of the effective negative voltage. In addition, when the designated value Q is zero, the alternating signal FRx of the known technology is generated.

Here, the case where five frames are set to a unit has been described, but the number of frames may be preferably set to three frames or more, and may be properly set according to the magnitude of the correction voltage for the second phenomenon.

In addition, similarly to the first embodiment, the counter electrode potential Com is shifted from the reference voltage Vc by the correction voltage for the first phenomenon (field-through).

As described above, according to this embodiment, the following effects can be obtained.

In the frame inversion driving in which the polarity of the data signal Vid is inversed in the unit of a frame, the counter electrode potential Com is shifted by the correction voltage for the first phenomenon, and three successive frames or more are set as a unit to adjust the ratio of the number of frame applied with the positive driving voltage to and the number of frame applied with the negative driving voltage according to the designated value Q. Therefore, it is possible to suppress the disadvantages of display, such as the flicker and the burn-in of the display image, compared with the known driving method.

In addition, since each scanning line is selected just once in one frame triggered by the vertical synchronization signal Vs, the configuration of the frame memory 57 (see FIG. 1) is simplified, so that the configuration of the electro-optical device can be simplified. In particular, when the image signal including the display data Video supplied from the external device, the vertical synchronization signal Vs, or the like is suitable for the resolution and the characteristics of the display panel 10, it is also possible to omit the configuration of the frame memory 57 (see FIG. 1), so that it is also applicable to a small-sized or low-end electro-optical device.

When five successive frames are set as a unit, it is possible to perform the correction in 20% scale, so that the correction can be also performed in the case where the correction voltage in the second phenomenon is large. In addition, by increasing the number of frames constituting one unit, it is possible to reduce the scale of the correction.

Sixth Embodiment

Figure 25:
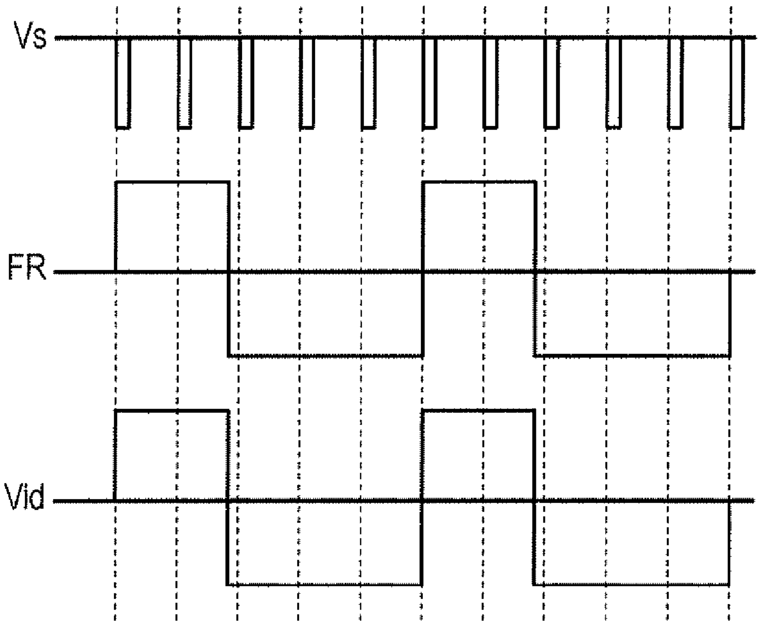
FIG. 25 is a view illustrating a timing chart in a driving method according to a sixth embodiment.

FIG. 25 shows a timing chart in a driving method according to a sixth embodiment.

Here, the description already given in the fifth embodiment will be omitted, and the same components will be described with the same numerals.

The electro-optical device according to the sixth embodiment has the same configuration as that of the electro-optical device according to the fifth embodiment. The driving method according to the sixth embodiment is different from the driving method according to the fifth embodiment in that the level of the alternating signal FR is changed at asynchronous timing with the vertical synchronization signal Vs.

In the driving method according to this embodiment, similarly to the fifth embodiment, for example, five frames are set as a unit, and the ratio of the number of frames applied with the positive and negative polarities is adjusted according to the designated value Q. However, there is a frame in which date signal of both polarities is applied.

For example, when the designated value Q is a minus value, as shown in FIG. 25, the waveform of the alternating signal FR includes one frame of the positive polarity, one frame in which the polarity changes, and three frames of the negative polarity. Specifically, the ratio of the positive polarity to the negative polarity becomes 1.8:3.2.

Here, the polarity inversion timing in the second frame is not synchronous with the vertical synchronization signal Vs, but is carried out at timing according to the designated value Q. Specifically, the corresponding polarity inversion timing is set to the timing which is obtained from the optimal ratio of the positive polarity to the negative polarity properly divided in five frames according to the correction voltage of the second phenomenon without depending on the vertical synchronization signal Vs. In addition, this timing is set by being synchronized with a signal, for example, the clock signal Cly etc., of which period is shorter than the vertical synchronization signal Vs.

Therefore, the data signal Vid is also generated at the ratio of 1.8:3.2 of the positive polarity to the negative polarity according to the level of the alternating signal FR.

As a result, the balance between the positive voltage and the negative voltage applied to the liquid crystal capacitor 120 is lost, and the absolute value of the effective negative voltage is greater than the absolute value of the effective positive voltage.

In addition, when the designated value Q is a plus value, for example, the alternating signal FR is generated at the ratio of 3.3:1.7 of the positive polarity to the negative polarity in the sequence of three frames of the positive polarity, one frame in which the polarity changes, and one frame of the negative polarity.

Accordingly, the data signal Vid is also generated at the ratio of 3.3:1.7 of the positive polarity to the negative polarity according to the polarity of the alternating signal FR.

As a result, the absolute value of the effective positive voltage is greater than the absolute value of the effective negative voltage. In addition, when the designated value Q is zero, the alternating signal FRx of the known technology is generated.

In addition, similarly to the first embodiment, the counter electrode potential Com is shifted from the reference voltage Vc by the correction voltage for the first phenomenon (field-through).

As described above, according to this embodiment, in addition to the effects of the fifth embodiment, the following effects can be obtained.

By setting the polarity inversion timing within one frame to the timing according to the designated value Q which is asynchronous with the vertical synchronization signal Vs, it is possible to perform the minute correction compared with the correction performed in the frame unit.

For example, when the period length of one frame is divided into 10 portions, it is possible to perform the adjustment in 2% scale.

Accordingly, the correction can be performed with high precision even when the correction voltage for the second phenomenon is large.

Electronic Apparatus

Figure 26:
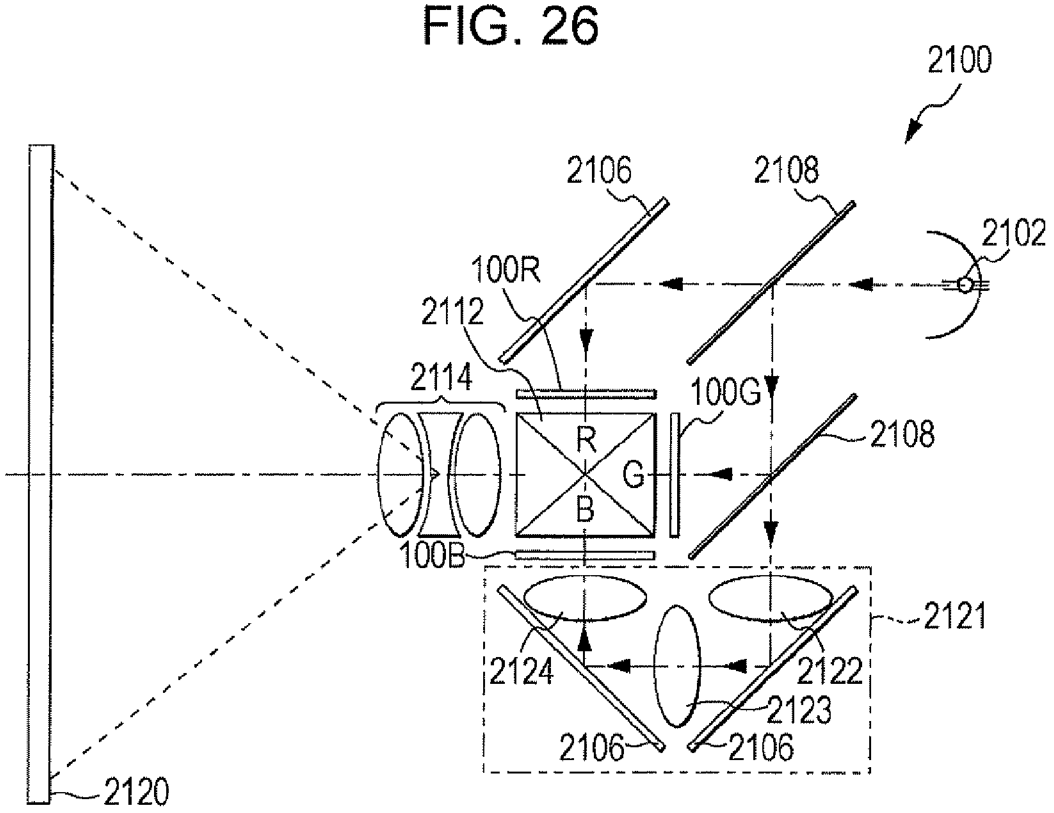
FIG. 26 is a plan view illustrating a configuration of a projector.

FIG. 26 is a plan view illustrating a configuration of a three-panel type projector using the display panel 10 of the above-mentioned electro-optical device 1 as a light valve.

Next, an example of an electronic apparatus using the electro-optical device according to this embodiment described above will be described now.

In a projector 2100, incident light to the light valves is divided into the three primary colors of R (red), G (green), and B (blue) by three mirrors 2106 and two dichroic mirrors 2108 which are disposed inside, and the primary colors are led to the light valves 100R, 100G, and 100B corresponding to the three primary colors, respectively. In addition, the light of color B has an optical length longer than that of the light of color R or the light of color G, so that the light of color B is led through a relay lens system 2121 provided with an incident lens 2122, a relay lens 2123, and an emission lens 2124 in order to prevent loss due to the difference.

The configuration of the light valves 100R, 100G, and 100B is the same as that of display panel 10 in each embodiment described above, and all of which are driven by pixel data corresponding to the respective colors R, G, and B supplied from the external device (not shown).

The lights modulated by the light valves 100R, 100G, and 100B are incident on the dichroic prism 2112 from three directions. Then, in the dichroic prism 2112, the lights of color R and color B are refracted at 90 degree, and on the other hand, the light of color G goes straight. The light which represents a color image synthesized in the dichroic prism 2112 is enlarged and projected by a lens unit 2114, and a full-color image is displayed on a screen 2120.

The images transmitted through the light valves 100R and 100B are reflected by the dichroic prism 2112 to be projected, and the image transmitted through the light valve 100G is projected as it is, so that the images formed by the light valves 100R and 100B and the image formed by the light valve 100G are set to be in a relation to each other in horizontal inversion.

In addition to the projector described with reference to FIG. 26, as an example of the electronic apparatus, there includes a rear projection type television, or a direct view type apparatus, for example, a portable telephone, a personal computer, a video camera monitor, a car navigation device, a pager, an electronic notepad, an electronic calculator, a word processor, a work station, a TV telephone, a POS terminal, a digital still camera, an apparatus provided with a touch panel, or the like. The electro-optical device according to the invention is also applicable to these electronic apparatuses.

In addition, the invention is not limited to the embodiments described above, and various changes and improvements can be made. Modified examples will be described below.

Modified Example

In the above-mentioned embodiments, a so-called point sequential addressing scheme is employed in which the voltage according to the gray scale is written to the pixels disposed along the scanning line 112 of one row in the sequence of the 1st row to 640th row by sequentially sampling the data signal Vid from the 1st column to the 640th column. However, a configuration of a so-called phase expansion (referred to as serial-parallel conversion) driving scheme may be used together in which the data signal is expanded to n (n is an integer of 2 or more) times in a time axis to be supplied to n pixel signal lines (refer to JP-A-2000-112437).

In addition, a line sequential addressing scheme may also be employed in which the data signals are simultaneously supplied to all the data lines 114 at once.

In these driving methods, operational advantages similar to the embodiments can be obtained. Further, in the above-mentioned embodiments, the explanation has been made for the configuration applied with one of the normally white mode for displaying the white color in a state of no voltage application and the normally black mode for displaying the black color in the state of no voltage application as the liquid crystal mode. However, the invention is also applicable to the other liquid crystal mode.

What is claimed is:

1. A method of driving an electro-optical device including a plurality of scanning lines, a plurality of data lines, a switching transistor and a pixel electrode which are provided at an intersection between one of the scanning lines and one of the data lines, a counter electrode opposite to the pixel electrode, and an electro-optical layer interposed between the pixel electrode and the counter electrode, the method comprising:

supplying a data signal alternately having a positive voltage and a negative voltage to the pixel electrode through the one of the data line provided that the positive voltage is of a potential greater than a counter electrode potential applied to the counter electrode and that the negative voltage is of a potential lower than the counter electrode potential;

setting the counter electrode potential to reduce a flicker;

in a predetermined period which comprises a first period and a second period, supplying a first voltage that is one of the positive voltage and the negative voltage to the pixel electrode in the first period; and supplying a second voltage that is the other of the positive voltage and the negative voltage to the pixel electrode in the second period; wherein a ratio of a length of the first period to a length of the second period is variable in the predetermined period, the ratio of the length of the first period to the length of the second period is varied after the counter electrode potential has been set to reduce the flicker, the predetermined period corresponds to one frame, the one frame comprises a first field and a second field, the first field corresponds to the first period, the second field corresponds to the second period, and in one of the first field and the second field, a ratio of a period length of the first field to a period length of the second field in the one frame is adjusted by supplying a third voltage as the data signal to the data line during a third period.

2. The method of driving the electro-optical device according to claim 1, wherein the third voltage is a voltage corresponding to a black display.

3. The method of driving the electro-optical device according to claim 1, wherein provided that N scanning lines are provided, a first scanning line group is set from a first scanning line to an Mth scanning line, and a second scanning line group is set from an (M+1)th scanning line to an Nth scanning line, any one scanning line of the first scanning line group and any one scanning line of the second scanning line group are alternately selected over the one frame, in the first field, the first voltage is applied to a pixel electrode corresponding to a scanning line that belongs to the first scanning line group and the second voltage is applied to a pixel electrode corresponding to a scanning line that belongs to the second scanning line group, and in the second field, the second voltage is applied to the pixel electrode corresponding to the scanning line that belongs to the first scanning line group and the first voltage is applied to the pixel electrode corresponding to the scanning line that belongs to the second scanning line group.

4. The method of driving the electro-optical device according to claim 1, wherein the predetermined period corresponds to a plurality of frames which comprises two or more successive frames, and a ratio of a period length applied with the positive voltage to a period length applied with the negative voltage is changed in the predetermined period.

5. An electro-optical device comprising:

a plurality of scanning lines;

a plurality of data lines;

a switching transistor and a pixel electrode which are provided at an intersection between one of the scanning lines and one of the data lines;

a counter electrode opposite to the pixel electrode; and an electro-optical layer interposed between the pixel electrode and the counter electrode, wherein a data signal alternately having a positive voltage and a negative voltage is supplied to the pixel electrode through the one of the data line provided that the positive voltage is of a potential greater than a counter electrode potential applied to the counter electrode and the that the negative voltage is of a potential lower than the counter electrode potential, the counter electrode is supplied with a counter electrode potential set to reduce a flicker, in a predetermined period which comprises a first period and a second period, a first voltage that is one of the positive voltage and the negative voltage is supplied to the pixel electrode in the first period, and a second voltage that is the other of the positive voltage and the negative voltage is supplied to the pixel electrode in the second period, and the electro-optical device further comprising a control circuit adjusting a ratio of a length of the first period to a length of the second period in the predetermined period, the ratio of the length of the first period to the length of the second period is adjusted after the counter electrode potential has been set to reduce the flicker, the predetermined period corresponds to one frame, the one frame comprises a first field and a second field, the first field corresponds to the first period, and the second field corresponds to the second period, and a ratio of a period length of the first field to a period length of the second field in the one frame is adjusted by supplying a third voltage as the data signal to the data line during at least one clock cycle.

6. An electronic apparatus comprising the electro-optical device according to claim 5.

7. The method of driving an electro-optical device according to claim 1, further comprising:

setting the counter electrode potential to reduce the flicker by applying a constant correction voltage during the predetermined period.

8. The method of driving the electro-optical device according to claim 1, wherein the predetermined period corresponds to one frame, the one frame comprises a first field and a second field, the first field corresponds to the first period, and the second field corresponds to the second period, and a ratio of a period length of the first field to a period length of the second field in the one frame is adjusted by supplying a third voltage as the data signal to the data line during at least one clock cycle.

9. The electro-optical device according to claim 5, wherein the predetermined period corresponds to one frame, the one frame comprises a first field and a second field, the first field corresponds to the first period, and the second field corresponds to the second period, and in one of the first field and the second field, a ratio of a period length of the first field to a period length of the second field in the one frame is adjusted by supplying a third voltage as the data signal to the data line during a third period.

10. A method of driving an electro-optical device including a plurality of scanning lines, a plurality of data lines, a switching transistor and a pixel electrode which are provided at an intersection between one of the scanning lines and one of the data lines, a counter electrode opposite to the pixel electrode, and an electro-optical layer interposed between the pixel electrode and the counter electrode, the method comprising:

supplying a data signal alternately having a positive voltage and a negative voltage to the pixel electrode through the one of the data line provided that the positive voltage is of a potential greater than a counter electrode potential applied to the counter electrode and that the negative voltage is of a potential lower than the counter electrode potential;

setting the counter electrode potential to reduce a flicker;

in a predetermined period which comprises a first period and a second period, supplying a first voltage that is one of the positive voltage and the negative voltage to the pixel electrode in the first period; and supplying a second voltage that is the other of the positive voltage and the negative voltage to the pixel electrode in the second period; wherein a ratio of a length of the first period to a length of the second period is variable in the predetermined period, the ratio of the length of the first period to the length of the second period is varied after the counter electrode potential has been set to reduce the flicker, the predetermined period corresponds to one frame, the one frame comprises a first field and a second field, the first field corresponds to the first period, and the second field corresponds to the second period, and a ratio of a period length of the first field to a period length of the second field in the one frame is adjusted by supplying a third voltage as the data signal to the data line during at least one clock cycle.

11. The method of driving the electro-optical device according to claim 10, wherein the predetermined period corresponds to one frame, the one frame comprises a first field and a second field, the first field corresponds to the first period, and the second field corresponds to the second period.

12. The method of driving the electro-optical device according to claim 11, wherein in one of the first field and the second field, a ratio of a period length of the first field to a period length of the second field in the one frame is adjusted by supplying a third voltage as the data signal to the data line during a third period.

13. The method of driving the electro-optical device according to claim 12, wherein the third voltage is a voltage corresponding to a black display.

14. The method of driving the electro-optical device according to claim 10, wherein provided that N scanning lines are provided, a first scanning line group is set from a first scanning line to an Mth scanning line, and a second scanning line group is set from an (M+1)th scanning line to an Nth scanning line, any one scanning line of the first scanning line group and any one scanning line of the second scanning line group are alternately selected over the one frame, in the first field, the first voltage is applied to a pixel electrode corresponding to a scanning line that belongs to the first scanning line group and the second voltage is applied to a pixel electrode corresponding to a scanning line that belongs to the second scanning line group, and in the second field, the second voltage is applied to the pixel electrode corresponding to the scanning line that belongs to the first scanning line group and the first voltage is applied to the pixel electrode corresponding to the scanning line that belongs to the second scanning line group.

15. The method of driving the electro-optical device according to claim 10, wherein the predetermined period corresponds to a plurality of frames which comprises two or more successive frames, and a ratio of a period length applied with the positive voltage to a period length applied with the negative voltage is changed in the predetermined period.

* * * * *